(12) United States Patent
Rieger et al.

(10) Patent No.: US 8,582,584 B2
(45) Date of Patent: Nov. 12, 2013

(54) SELF-MONITORING AND OPTIMIZING NETWORK APPARATUS AND METHODS

(75) Inventors: Remi Rieger, Charlotte, NC (US); Paul D. Brooks, Weddington, NC (US)

(73) Assignee: Time Warner Cable Enterprises LLC, New York, NY (US)

( * ) Notice: Subject to any disclaimer, the term of this patent is extended or adjusted under 35 U.S.C. 154(b) by 1773 days.

(21) Appl. No.: 11/243,720

(22) Filed: Oct. 4, 2005

(65) Prior Publication Data

US 2007/0076728 A1 Apr. 5, 2007

(51) Int. Cl.
H04L 12/56 (2011.01)
(52) U.S. Cl.
USPC ............ 370/401; 370/431; 370/468; 370/486
(58) Field of Classification Search
USPC ................. 370/230, 360, 401, 431, 468, 486; 348/731; 725/31, 132
See application file for complete search history.

(56) References Cited

U.S. PATENT DOCUMENTS

| | | | |
|---|---|---|---|
| 5,758,257 A | | 5/1998 | Herz et al. |
| 6,088,722 A | | 7/2000 | Herz et al. |
| 6,188,687 B1 * | | 2/2001 | Mussman et al. ............. 370/388 |
| 6,317,885 B1 * | | 11/2001 | Fries .............................. 725/109 |
| 6,446,261 B1 | | 9/2002 | Rosser |
| 6,463,585 B1 | | 10/2002 | Hendricks et al. |
| 6,687,735 B1 | | 2/2004 | Logston et al. |
| 7,020,893 B2 | | 3/2006 | Connelly |
| 7,197,472 B2 | | 3/2007 | Conkwright |
| 7,284,064 B1 | | 10/2007 | Connelly |
| 2001/0039656 A1 * | | 11/2001 | Nakamura et al. ................. 725/9 |
| 2002/0032754 A1 | | 3/2002 | Logston et al. |
| 2002/0078444 A1 | | 6/2002 | Krewin et al. |
| 2002/0087976 A1 | | 7/2002 | Kaplan et al. |
| 2002/0123928 A1 | | 9/2002 | Eldering et al. |
| 2002/0178446 A1 * | | 11/2002 | Sie et al. ........................... 725/32 |
| 2003/0043789 A1 * | | 3/2003 | Okajima et al. .............. 370/360 |
| 2003/0056217 A1 | | 3/2003 | Brooks |
| 2003/0126611 A1 | | 7/2003 | Chernock et al. |
| 2003/0140351 A1 * | | 7/2003 | Hoarty et al. .................. 725/132 |
| 2003/0142690 A1 | | 7/2003 | Beser |
| 2003/0145323 A1 * | | 7/2003 | Hendricks et al. ............... 725/34 |
| 2003/0177488 A1 * | | 9/2003 | Smith et al. ........................ 725/9 |
| 2003/0217365 A1 | | 11/2003 | Caputo |
| 2003/0221191 A1 | | 11/2003 | Khusheim |
| 2004/0010588 A1 * | | 1/2004 | Slater et al. .................... 709/224 |
| 2004/0133907 A1 * | | 7/2004 | Rodriguez et al. .............. 725/14 |
| 2004/0189879 A1 * | | 9/2004 | Read .............................. 348/731 |
| 2005/0055685 A1 | | 3/2005 | Maynard |
| 2005/0066355 A1 * | | 3/2005 | Cromer et al. .................. 725/31 |

(Continued)

*Primary Examiner* — Brian D Nguyen
*Assistant Examiner* — Toan Nguyen
(74) *Attorney, Agent, or Firm* — Gazdzinski & Associates, PC

(57) ABSTRACT

Methods and apparatus for dynamically and automatically allocating network resources through anticipatory analysis and control. In an exemplary embodiment, the network comprises a broadcast switched digital architecture, and network bandwidth allocation to multiple digital program streams is performed by processing historical user tuning data, which is obtained directly from the subscriber's consumer premises equipment (e.g., DSTB). When an increase or decrease in bandwidth required to support certain programs is anticipated, network resource re-allocation is performed automatically by a software process running on the switching server. In this fashion, speculative but "intelligent" projections of bandwidth and program stream requirements can be made automatically by the server software, without operator intervention. The server also optionally dictates the optimal monitoring and data collection parameters to the DSTB.

25 Claims, 9 Drawing Sheets

(56) References Cited

U.S. PATENT DOCUMENTS

| | | | |
|---|---|---|---|
| 2005/0235307 A1* | 10/2005 | Relan et al. | 725/14 |
| 2005/0240966 A1* | 10/2005 | Hindle et al. | 725/45 |
| 2006/0140206 A1 | 6/2006 | Kataria | |
| 2006/0171423 A1 | 8/2006 | Helms | |
| 2007/0022459 A1 | 1/2007 | Gaebel | |

* cited by examiner

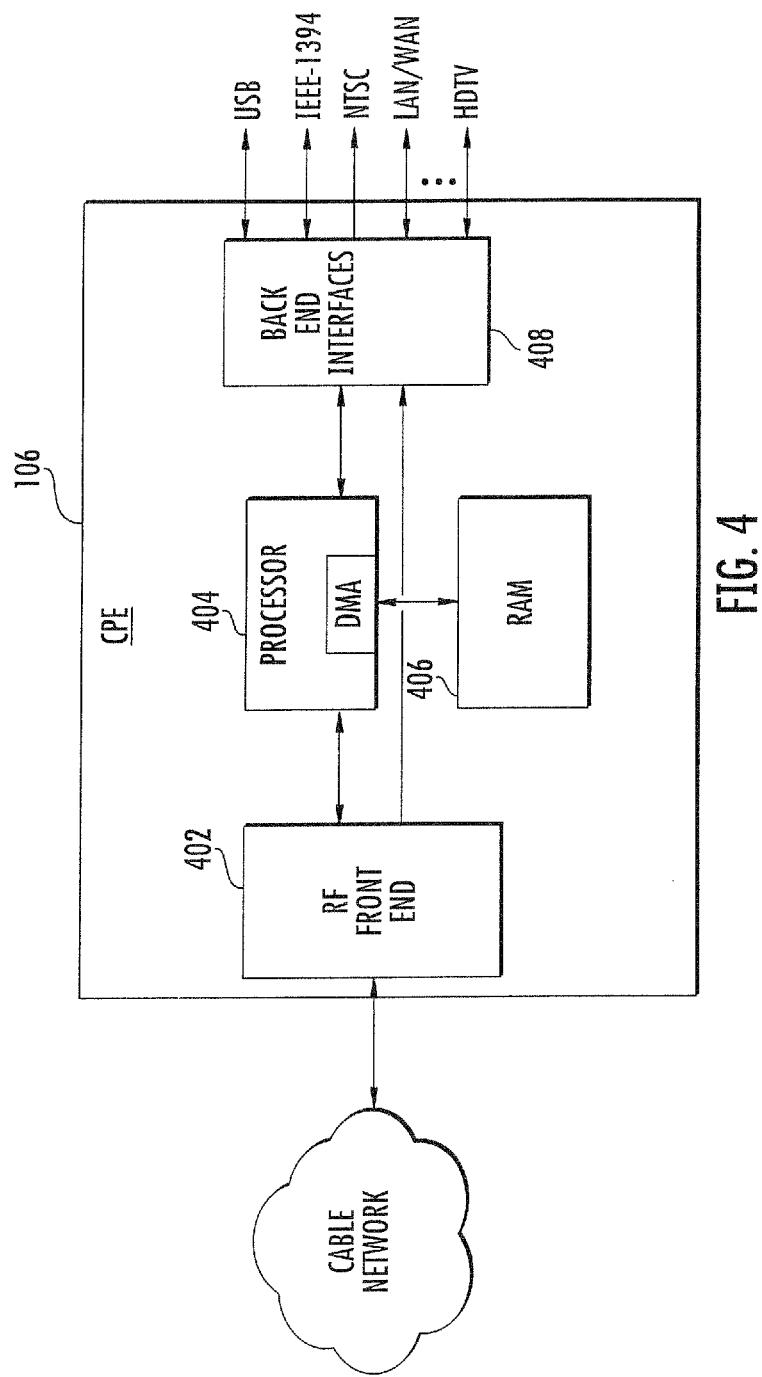

SELF-MONITORING AND OPTIMIZING NETWORK APPARATUS AND METHODS

BACKGROUND OF THE INVENTION

1. Field of Invention

The present invention relates generally to the field of network bandwidth utilization, and specifically in one aspect to managing and conserving available bandwidth on the network in order to provide optimal support for video services over a content-based network such as a cable television network.

2. Description of Related Technology

One significant competitive challenge presently faced by network operators relates to managing and conserving bandwidth. This includes the reclamation of otherwise underutilized or unused bandwidth such that the service and/or customer base can be expanded without significant modifications or build-outs of the underlying network infrastructure. For example, it is clearly desirable to expand the types and availability of "next-generation" network services, including high-definition (HD) broadcast, VOD, high-speed data, VoIP, Interactive TV, etc. over time, without the need for major capital expenditures or system modifications. Hence, network operators are increasingly focused on techniques for "squeezing" as much capacity out of their existing networks as possible.

The foregoing need for bandwidth optimization and reclamation is also applicable to so-called "switched" network architectures. These architectures generally distribute all of the available content provided by the network operator (e.g., MSO) to switches within the network; these switches are then used to selectively provide only those channels actually watched or requested by users to their hubs or nodes for delivery, thereby effectively deleting unwatched channels from the digital broadcast stream. A "deleted" channel is automatically switched back on when a subscriber subsequently selects it, with the switching and delivery transition being for all intents and purposes transparent to the subscriber. This approach has obvious benefits from the standpoint of bandwidth conservation.

One way that networks (including the aforementioned broadcast switched type) can attempt to optimize bandwidth usage is to determine a usage profile as a function of time (or other events). For example, by knowing that usage or particular assets (or the network as a whole) rises and falls at certain times of the day, the network operator can more efficiently allocate bandwidth and schedule activities (such as maintenance and testing). A higher level of granularity of this type of information is desirable; it would clearly be optimal to know what every subscriber in the network was planning on doing in terms of usage patterns. From this information, both individual and aggregated usage patterns could be determined, thereby allowing for maximal "shaping" of the network bandwidth allocation to the actual use patterns. However, this level of information has heretofore been substantially unattainable, due largely to the inability (i) for the consumer premises equipment (CPE) of the subscribers to effectively gather and send information back to the cognizant network operator/entity in a timely fashion, (ii) the network operator/entity to analyze the data to identify usage patterns and trends, and (iii) the network operator/entity to generate useful and timely corrections and insert them back into the operations profile of the network in order to take advantage of the identified patterns/trends in terms of bandwidth allocation.

Regarding Items (i) and (ii) above, a number of different approaches to subscriber/client device profiling and bandwidth optimization are evidenced in the prior art. For example, U.S. Pat. No. 6,088,722 to Herz, et al. issued Jul. 11, 2000 entitled "System and method for scheduling broadcast of and access to video programs and other data using customer profiles" discloses a system and method for scheduling the receipt of desired movies and other forms of data from a network, which simultaneously distributes many sources of such data to many customers, as in a cable television system. Customer profiles are developed for the recipient describing how important certain characteristics of the broadcast video program, movie, or other data are to each customer. From these profiles, an "agreement matrix" is calculated by comparing the recipient's profiles to the actual profiles of the characteristics of the available video programs, movies, or other data. The agreement matrix thus characterizes the attractiveness of each video program, movie, or other data to each prospective customer. "Virtual" channels are generated from the agreement matrix to produce a series of video or data programming which will provide the greatest satisfaction to each customer. Feedback paths are also provided so that the customer's profiles and/or the profiles of the video programs or other data may be modified to reflect actual usage, and so that the data downloaded to the customer's set top terminal may be minimized. Kiosks are also disclosed which assist customers in the selection of videos, music, books, and the like in accordance with the customer's objective profiles. See also U.S. Pat. No. 5,758,257.

U.S. Pat. No. 6,446,261 to Rosser issued Sep. 3, 2002 entitled "Set top device for targeted electronic insertion of indicia into video" discloses a method of ostensibly anonymous targeted insertion of indicia into video broadcasts. Individual televisions or other video reception devices are associated with set-top boxes that monitor the usage and viewing habits of the television set or other video reception device. A viewer profile derived from data acquired from said monitoring is created wherein the viewer profile indicates certain characteristics about the viewer. This profile is transmitted to a centralized database, the centralized database being an intermediate link between the origin of the video broadcast and the end viewer. The purpose of the database is to link specific insertable indicia with matching specific viewer profiles. The insertable indicia are encoded directly into the broadcast video and re-broadcast to the end viewer where the set-top box decodes the broadcast video and performs insertion of the indicia. Thus, the system and method allow advertisers to target specific ads or indicia to specific viewing profiles.

U.S. Pat. No. 6,463,585 to Hendricks, et al. issued Oct. 8, 2002 entitled "Targeted advertisement using television delivery systems" discloses a multiple channel architecture designed to allow targeted advertising directed to television terminals connected to an operations center or a cable headend. Program channels carry television programs. During commercial breaks in the television programs, advertisements, which are also broadcast on the program channel, are displayed. However, additional feeder channels carry alternate advertising that may be better suited for certain viewing audiences. The operations center or the cable headend generate a group assignment plan that assigns the television terminals to groups, based on factors such as area of dominant influence and household income. A switching plan is then generated that instructs the television terminals to remain with the program channel or to switch to one of the alternate feeder channels during the program breaks. The television terminals record which channels were viewed during the program breaks, and report this information to the cable headends and the operations center. The reported information is used to generate billing for commercial advertisers, and to analyze viewer watching habits. The invention uses upstream data reception hardware, databases and processing hardware and software to accomplish these functions.

U.S. Pat. No. 6,687,735 to Logston, et al. issued Feb. 3, 2004 entitled "Method and apparatus for balancing distributed applications" discloses a method and apparatus for balancing distributed applications within a client/server network, such as a cable television network. In one aspect of the invention, a method of balancing the load of distributed application client portions (DACPs) across various server portions (DASPs) and server machines is disclosed. Statistics are maintained by one or more software processes with respect to the available resources of the servers and their loading; new process threads and/or distributed application server portions are allocated across the servers to maintain optimal system performance as client device loading increases or changes. In another aspect of the invention, an object-oriented distributed application software architecture employing both vertical and horizontal partitions and "mutable" (i.e., transportable) objects is disclosed. The mutable objects may reside on either the server or client portions of the distributed application while maintaining at least one network partition. A runtime environment adapted for the operation of the foregoing object-oriented distributed application, including an efficient message protocol useful for interprocess communication, is also disclosed. Methods for downloading the DACP from the servers, and scaling the DACP at download based on client device configuration, are further disclosed.

U.S. Patent Application Publication No. 20020032754 to Logston, et al. published Mar. 14, 2002 entitled "Method and apparatus for profiling in a distributed application environment" discloses a method and apparatus for deriving and characterizing the resource capabilities of client devices in a distributed application (DA) network environment. In a first aspect of the invention, a method and associated architecture for obtaining client device configuration and resource information are disclosed which incorporate a distributed profiling entity having a server portion and client portion, the client portion being used to facilitate query of the client device, and transfer of device resource and configuration information back to the server portion. This information is later used by the profiling entity to alter and update the distribution of entity components between the server and client device. The client device configuration may also be altered if required. In a second aspect of the invention, a method of scaling the aforementioned distributed profiling entity during both initial download and after initiation is disclosed.

U.S. Patent Application Publication No. 20020078444 to Krewin, et al. Jun. 20, 2002 entitled "System and method for the scaleable delivery of targeted commercials" discloses a system for the delivery of targeted advertising wherein a viewer profiling system distributes view profile data to control devices. Insertion orders are broadcast to the control devices or and the control devices store selected insertion orders based on the profile data. Broadcast commercials are displayed according to the acquisition field of the stored insertion orders.

U.S. Patent Application Publication No. 20020087976 to Kaplan, et al. published Jul. 4, 2002 entitled "System and method for distributing video with targeted advertising using switched communication networks" discloses a system and method for delivering broadcast-quality video with targeted advertising to viewers over the switched communication network. According to one embodiment, program streams with appropriately inserted splice points are transmitted from a network head end node to one or more egress nodes via a switched network. Because the switched network only carries program streams while advertising is inserted at the edges of the network, programs with demographically-targeted advertising can be delivered to many different subscribers without the need for using the bandwidth of the switched network to carry a unique program and advertising stream for each demographic group from the head end node.

U.S. Patent Application Publication No. 20020123928 to Eldering, et al. published Sep. 5, 2002 entitled "Targeting ads to subscribers based on privacy-protected subscriber profiles" discloses the monitoring subscriber viewing interactions, such as television viewing interactions, and generating viewing characteristics therefrom. At least one type of subscriber profile is generated from at least some subset of subscriber characteristics including viewing, purchasing, transactions, statistical, deterministic, and demographic. The subscriber characteristics may be generated, gathered from at least one source, or a combination thereof. Groups of subscribers are formed by correlating at least one type of subscriber profile. The subscriber groups may correlate to elements of a content delivery system (such as head-ends, nodes, branches, or set top boxes (STBs) within a cable TV system). Advertisement profiles are correlated to subscriber/subscriber group profiles, and targeted advertisements selected for the subscribers/subscriber groups based on the correlation. The targeted advertisements are inserted in place of default ads in program streams somewhere within the content delivery system (head-end, node, or STB), and presented to the subscriber/subscriber group via a television.

U.S. Patent Application Publication No. 20030126611 to Chernock, et al. published Jul. 3, 2003 entitled "Methods and apparatus for controlling interactive television information and commerce services" discloses an apparatus for an interactive television commerce environment, acting as a central point of control and information for enabling and facilitating information distribution and transactions in this environment. The apparatus is an element of an interactive television (ITV) commerce system, and enables the introduction of interactive commerce services in cable, satellite, and other broadcast networks. Other services provided include interfacing with off-line interactive advertisements, historical review and tracking services for users, and providing feedback and ITV ad modification capabilities to advertisers. The apparatus, residing at a local head end, can also add to or modify ads by inserting content of local relevance.

U.S. Patent Application Publication No. 20030142690 to Beser published Jul. 31, 2003 entitled "Use of group poll scheduling for broadband communication systems" discloses a group poll mechanism (GPM) that schedules upstream bandwidth for cable modems by pointing a request opportunity normally reserved for a single service flow to more than one service flow. Essentially, instead of using the seldom-used poll requests one per service flow, this same request opportunity is pointed to multiple service flows. In such kind of a scheme the GPM gives the same mini-slot to multiple service flows. The GPM implements the use of place-holder SIDs and mapping of information elements in MAP messages.

U.S. Patent Application Publication No. 20030221191 to Khusheim published Nov. 27, 2003 entitled "System and method for directed television and radio advertising" discloses a method and a device that selects a commercial message for presentation based on user profile criteria. A programming content signal is received at a customer premises equipment (CPE). A stored commercial message is selected for presentation during presentation of the programming content signal. The selected commercial message contains summary information related to an informational content of the selected commercial message, and is selected based on the summary information contained by the selected commercial message. Information relating to each commercial message presented and/or an interaction with a user can be recorded and sent to a central location.

One significant issue or disability with the foregoing methods relates to their lack of ability to gather subscriber activity (e.g., tuning and remote control unit) activity and aggregate this data into a historical database. Rather, such prior art approaches are "ethereal" from the standpoint that any data sent back to a supervisory entity (such as the head end) is typically not retained, but rather discarded after receipt. Reasons for this are manifold, including privacy concerns regarding the data and the subscriber from which it was obtained, data storage limitations, and simply the perceived lack of anything useful to do with the data.

Another significant issue with prior art approaches to bandwidth optimization in content-based networks (including the aforementioned broadcast switched architectures) relates to the requirement for manual intervention or input on the part of the network operator (e.g., MSO) in order to make best use of the available bandwidth. Specifically, many such systems require periodic operator adjustment and/or input, which may also include the requirement for periodic evaluation of the subscriber's viewing or tuning habits, and the generation of adjustments to be inserted into the system control functions based thereon. One disability with this approach is the need for constant (or near-constant) operator vigilance. Another disability is latency; the operator is basically always lagging the problem since changes in subscriber habits can occur rapidly, and the efficacy of any corrections made by the operator will in large part depend on the timeliness with which the operator performs his/her analysis and corrective action/adjustment. Greater operator vigilance is also required when the system is approaching the limits of its capacity, since excursions in demand or changes in viewer habits can easily cause an over-demand condition (potentially resulting in a loss of service to one or more subscribers for a period of time).

As previously discussed, another significant issue with the collection of data within a subscriber network is the need to maintain complete privacy and anonymity for individual subscribers from which the profiling information is obtained. Subscribers generally demand complete privacy regarding their viewing habits, type of content viewed, etc. Hence, any commercially practical system must maintain complete privacy. In other types of network paradigms (such as video-on-demand, or VOD), the subscriber's identity and tuner location is essential to instantiating and delivering the requested content, providing "trick mode" functions, billing the correct subscriber, etc. Furthermore, VOD is not a broadcast paradigm, and hence individual streams must be instantiated and generated for each subscriber, adding significant infrastructure and processing overhead.

Hence, based on the foregoing, there is a distinct need for improved apparatus and methods that permit the substantially automatic and timely (i) gathering of network usage and related data; (ii) storage and transmission of this data to a processing entity within the network, (iii) analysis of the data (including also historical or anecdotal data previously gathered); and (iv) anticipatory control and optimization of network operations based on the data analysis. Such improved apparatus and methods would ideally be adaptable to various network paradigms and architectures, and take advantage of and leverage the efficiencies provided by each different architecture (e.g., the broadcast switched architecture, including its capability for bandwidth conservation via cancellation of unused program streams). It would also ideally maintain complete user/subscriber anonymity regarding any collected profiling data. Mechanisms to effectively and adaptively implement different types of operational and/or business rules would also be provided.

SUMMARY OF THE INVENTION

The present invention satisfies the foregoing needs by providing improved apparatus and methods for monitoring and gathering network usage or other data and applying it to current and future bandwidth allocation strategy, such as may be used in a cable, DSL or satellite network.

In a first aspect of the invention, a method of allocating bandwidth in a content-based network is disclosed. In one embodiment, the method comprises: causing data to be gathered from a plurality of client devices in communication with the network; receiving the data from the client devices at a server in communication with the network; analyzing the data to identify one or more features therein; using at least one of the features to determine the value of at least one operational parameter used in operating the network; and applying the at least one value to the network to control the operation thereof. In one variant, the network comprises a broadcast switched architecture (BSA) digital network, and the method is implemented substantially by a server (software) process running on a switching server within the network. The client devices are instructed on data gathering according to rules provided by the server process. The viewer tuning data gathered by the client devices and returned to the server process is stored in a historical database, which is used as the basis for subsequent speculative or anticipatory control by the server process.

In another variant, the data obtained form the client devices is stored based at least in part on a hashed or cryptographic value of information identifying the individual one or ones of the client devices from which it was obtained. The information identifying the individual one or ones of the client devices comprises, e.g., at least one of: (i) TUNER ID, (ii) TUNER USE, or (iii) MAC address.

In a second aspect of the invention, apparatus for allocating bandwidth in a content based network having at least one server and a plurality of consumer premises equipment (CPE) is disclosed. In one embodiment, the apparatus comprises: at least one client side process operative to run on a corresponding at least on CPE, the client side process being adapted to collect data relating to the operation of the CPE; and a network side process running on the at least one server and adapted to receive the data; wherein the network side process comprises at least one computer program adapted to analyze the data and automatically generate one or more values of control parameters used in controlling the operation of the network. The client side process further comprises an API for the network side process to communicate therewith, the communication comprising at least information relating to the type of data to be collected by the client side process. In one variant, the network comprises a broadcast switched architecture (BSA) network having at least one switching node, and the one or more values are used to speculatively switch the switching node to deliver or not deliver individual ones of program streams to the CPE based on the analysis of the data by the at least one computer program.

In a third aspect of the invention, network server apparatus adapted for use in a broadcast switched digital network is disclosed. In one embodiment, the network has a plurality of client devices in communication therewith and is adapted to carry a plurality of program streams, and the apparatus comprise: a processor; a storage device in data communication with the processor; a network interface adapted to at least receive messages from the client devices; and a computer program operative to run on the server apparatus. The computer program is adapted to automatically: receive, over time, data from the client devices via the messages and relating to the operation of individual ones of the client devices; store the data on the storage device so as to form a historical database relating to the operation of a plurality of the client devices; analyze at least portions of the database to identify artifacts of interest therein; and generate one or more control values relating to the operation of the switched digital network based at least in part on the analysis. The data returned by the client devices comprises, e.g., (i) tuning activity on each client device and an associated timestamp; and (ii) remote control activity associated with each client device.

The control values may comprise, e.g., (i) total program stream pool size by service area; (ii) individual program stream reclamation times; and/or (iii) individual program stream initiation time.

In one variant, the analysis to identify artifacts comprises statistical analysis of the usage patterns of the plurality of client devices.

In another variant, the analysis comprises analysis of a first moving window of data having a first duration, and analysis of a second moving window of data having a second duration, the first duration being shorter than the second duration.

The computer program can further be adapted to determine a plurality of parameters relating to collection of the data by the client devices, and send information relating to these parameters to the client devices. These parameters include, e.g., (i) frequency of data sampling, and/or (ii) the interval or conditions upon which the data is sent to server apparatus.

In a fourth aspect of the invention, digital consumer premises equipment (CPE) is disclosed. In one embodiment, the CPE is adapted for use in a broadcast switched digital network having a server, and the CPE comprises: a processor; a network interface adapted to at least receive first messages directly or indirectly from the server, and transmit second messages directly or indirectly to the server; and at least one computer program operative to run on the CPE. The computer program is adapted to: receive one or more configuration messages relating to the collection of tuning data by the CPE; configure the CPE according to at least one of the messages; over time, collect data relating to the operation of the CPE; and transmit at least portions of the collected data back to the server via the second messages. In one variant, the computer program is further adapted to pre-process at least portions of the collected data before transmitting the second messages. Such pre-processing comprises, e.g., (i) filtration of the collected data, and/or (ii) calculation of parameters based on the collected data.

In a fifth aspect of the invention, a method of selectively providing program streams over a broadcast switched digital network having a server and a plurality of subscribers, is disclosed. In one embodiment, the subscribers each have a client device coupled to the network, and the method comprises: operating the client devices in the network; collecting data via each of the client devices, the collected data relating to the usage of the program streams by respective ones of the subscribers; transmitting at least portions of the collected data to the server; adding the transmitted data to a database comprising historical usage data within the network; analyzing at least portions of the database at the server to identify statistically significant variations or artifacts within at least the historical usage data; automatically and algorithmically generating one or more operational control values for the network based at least in part on the analysis; and implementing the control values within the network, the implementing comprising speculatively instantiating or terminating one or more of the program streams for at least one of the plurality of subscribers.

In a sixth aspect of the invention, storage apparatus for use in a network is disclosed. In one embodiment, the storage apparatus comprises: a storage medium adapted to store a plurality of data thereon, the plurality of data comprising a computer program, the program being operative to run on a computerized apparatus, the computer program being adapted to: receive, over time, data from a plurality of client devices of a network via messages and relating to the operation of individual ones of the client devices; store the data on a storage device in data communication with the computerized apparatus so as to form a historical database relating to the operation of a plurality of the client devices; analyze at least portions of the database to identify artifacts of interest therein; and generate one or more control values relating to the operation of a switched digital network based at least in part on the analysis.

In a seventh aspect of the invention, a method of doing business within a content based network is disclosed. In one embodiment, the network is adapted to selectively provide program streams, and has a server and a plurality of subscribers, the subscribers each having a client device coupled to the network, and the method comprises: operating the client devices in the network to view at least certain ones of the program streams as part of a subscription service; collecting data via each of the client devices, the collected data relating to the usage of the program streams by respective ones of the subscribers; transmitting at least portions of the collected data to the server; transmitting information relating to the identity of individual ones of the client devices to the server, the information at some point being cryptographically processed in order to maintain the anonymity of the subscribers; associating the collected data to respective ones of the client devices using at least the cryptographically processed information; analyzing at least portions of the data to identify one or more artifacts within the data; and selectively including or excluding at least one of the subscribers in or from a service group, respectively, based on the acts of associating and analyzing.

In an eighth aspect of the invention, a method of allocating resources within a content based network having a plurality of CPE and first and second content delivery subsystems is disclosed. In one embodiment, the method comprises: obtaining data from the CPE; storing the data in a database; and analyzing the data to generate operational control signals for the network, the control signals controlling allocation of the resources between the first and second delivery sub-systems. In one variant, the first and second subsystems comprise broadcast-switched and video-on-demand (VOD) systems, respectively, and the act of controlling allocation of the resources comprises controlling the allocation of bandwidth within at least one edge QAM of the network.

BRIEF DESCRIPTION OF THE DRAWINGS

FIG. 4 is a functional block diagram illustrating an exemplary CPE device adapted to gather data for the aforementioned anticipatory control functions.

DETAILED DESCRIPTION OF THE INVENTION

Figure 1:
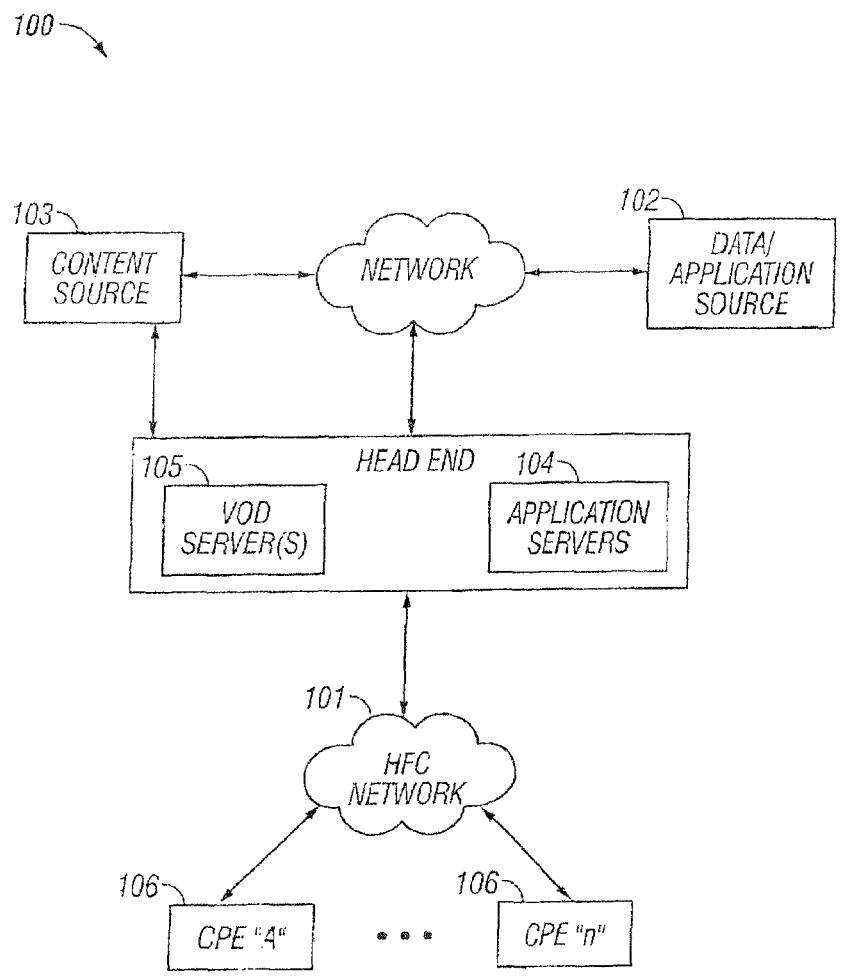
FIG. 1 is a functional block diagram illustrating an exemplary HFC cable network configuration useful with the present invention.

Reference is now made to the drawings wherein like numerals refer to like parts throughout.

As used herein, the terms "user channel" and "program channel" are all generally synonymous with the concept of a perceived stream of information. For example, a program/user channel might comprise "Channel 3" which carries the content of a given network (e.g., NBC). This is to be distinguished from a physical channel, which is used to physically carry and distribute the content, which may for example comprise one or more QAMs within a given portion of the RF spectrum of a cable system.

As used herein, the term "QAM" refers to modulation schemes used for sending signals over cable networks. Such modulation scheme might use any constellation level (e.g. QAM-16, QAM-64, QAM-256 etc.) depending on details of a cable network. A QAM may also refer to a physical channel modulated according to said schemes.

As used herein, the term "Service Group" refers to either a group of service users (e.g. subscribers) or the resources shared by them in the form of entire cable RF signal, only the RF channels used to receive the service or otherwise treated as a single logical unit by the network for resource assignment.

As used herein, the terms "MSO" or "multiple systems operator" refer to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the term "head-end" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, and the Internet. DSTBs may literally take on any configuration, and can be retail devices meaning that consumers may or may not obtain their DSTBs from the MSO exclusively. Accordingly, it is anticipated that MSO networks may have client devices from multiple vendors, and these client devices will have widely varying hardware capabilities. Multiple regional head-ends may be in the same or different cities.

As used herein, the terms "client device" and "end user device" include, but are not limited to, personal computers (PCs) and minicomputers, whether desktop, laptop, or otherwise, set-top boxes such as the Motorola DCT2XXX/5XXX and Scientific Atlanta Explorer 2XXX/3XXX/4XXX/6XXX/8XXX series digital devices, personal digital assistants (PDAs) such as the Apple Newton®, "Palm®" family of devices, handheld computers, personal communicators such as the Motorola Accompli or V710, J2ME equipped devices, cellular telephones, wireless nodes, or literally any other device capable of interchanging data with a network.

Similarly, the terms "Customer Premises Equipment (CPE)" and "host device" refer to any type of electronic equipment located within a customer's or user's premises and connected to a network. The term "host device" refers generally to a terminal device that has access to digital television content via a satellite, cable, or terrestrial network. The host device functionality may be integrated into a digital television (DTV) set. The term "customer premises equipment" (CPE) includes such electronic equipment such as set-top boxes, televisions, Digital Video Recorders (DVR), gateway storage devices (Furnace), and ITV Personal Computers.

As used herein, the term "network agent" refers to any network entity (whether software, firmware, and/or hardware based) adapted to perform one or more specific purposes. For example, a network agent may comprise a computer program running in server belonging to a network operator, which is in communication with one or more processes on a CPE or other device.

As used herein, the term "application" refers generally to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the term "computer program" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

The term "component" in the context of software refers generally to a unit or portion of executable software that is based on a related set of functionalities. For example, a component could be a single class in Java™ or C++. Similarly, the term "module" refers generally to a loosely coupled yet functionally related set of components.

As used herein, the term "server" refers to any computerized component, system or entity regardless of form which is adapted to provide data, files, applications, content, or other services to one or more other devices or entities on a computer network.

Overview

In one salient aspect, the present invention provides a substantially automated and anticipatory mechanism whereby a content-based network, such as a broadcast switched architecture (BSA) network, can effectively "self-monitor" and optimize its bandwidth allocation based on, inter alia, data received from the cable receivers (e.g., DSTBs) within its service area, or from the network as a whole. This approach replaces and substantially improves upon the manual review of activity data, and insertion of operational adjustments, prevalent under prior art network management techniques.

The foregoing information gathered from the CPE (as well as optionally other information relating to, e.g., the network itself or other historical periods) is used to provide anticipatory instantiation (or removal) of switched broadcast streams within a given network. A substantially automatic software-based mechanism to retrieve data from the CPE is utilized. Analysis of the historical tuning data obtained from segments of the subscriber pool provides this software process with insight as to the expected statistical variations of the system as a function of time and various events (e.g., holidays), and the expected statistical viewing behavior of known future details of the offered content, in effect allowing it to predict subscriber behavior and make adjustments to the operational parameters of the network based on these predictions. This "self monitoring" approach is contrast to the prior art, which gathers data and then discards it after a short period of time, thereby requiring constant operational status or usage updates and corrections.

By gathering, retaining and analyzing the data, the present invention allows the MSO or other network operator to build an ever-growing and continually changing historical database which is used by the "artificial intelligence" of the server process to generate adjustments to network operation parameters such as e.g., (i) total stream pool size by service area; (ii) individual channel reclamation times; and (iii) individual channel "on" times. It also allows for prioritization of QAM resources between multiple services contending for these resources (such as e.g., BSA and VOD systems). These adjustments can be made dynamically and automatically if desired, thereby relieving the network operator of much continued vigilance over the network.

The anticipatory control of the network operational parameters can also be performed on a per-CPE basis if desired using, e.g., methods for individually yet anonymously identifying specific CPE within the network, and gathering historical data relating particularly thereto. For example, if it is known that a particular subscriber is a notorious "channel hopper", the channel reclamation times associated with streams switched to that user (or a service group of users within which that particular user resides) may be adjusted accordingly. This anticipatory control may also be applied to and based on data from small groups of subscribers, in particular, the aggregate behavior of subscribers within a service group.

Improved network and CPE apparatus capable of implementing the aforementioned anticipatory control methodologies are also described, as well as mechanisms to implement operational and/or business rules during network operations.

Detailed Description of Exemplary Embodiments

Exemplary embodiments of the apparatus and methods of the present invention are now described in detail. While these exemplary embodiments are described in the context of the aforementioned hybrid fiber coax (HFC) cable architecture having an multiple systems operator (MSO), digital networking capability, and plurality of client devices/CPE, the general principles and advantages of the invention may be extended to other types of networks and architectures where bandwidth conservation is required or desirable, whether broadband, narrowband, wired or wireless, content or data, or otherwise. Hence, the following description is merely exemplary in nature. For example, the invention may be practiced over a fiber-to-the-home (FTTH) or fiber-to-the-curb (FTTC) system or over future satellite or millimeter wave-based network having two-way capabilities similar to today's digital cable HFC networks.

It will also be appreciated that while described generally in the context of a network providing service to a customer or consumer (i.e., residential) end user domain, the present invention may be readily adapted to other types of environments including, e.g., commercial/enterprise, and government/military applications. Myriad other applications are possible.

It is also noted that while the following discussion is cast primarily in terms of two service levels (i.e., SD and HD), the methods and apparatus disclosed herein can be extended to other numbers and types of service levels. For example, it is foreseeable that yet even higher levels of definition may be employed in the future (e.g., "ultra-high definition" or UHD), thereby allowing intelligent bandwidth conservation between three service levels (SD, HD, and UHD). As another option, multiple levels or rates may be present with one of the aforementioned service levels, such as where the SD level includes levels SD1, SD2, . . . SDn, and/or the HD level similarly includes HD1, HD2, . . . HDn, with each of these sub-levels having different data rates and/or other characteristics. Alternatively, bandwidth conservation according to the present invention may be performed not based on definition level (data rate), but some other attribute such as for example the selective availability of a type of service (e.g., OD, IPTV, or DVR/PVR). Various alternate conservation schemes are described subsequently herein in greater detail.

It is further noted that while described primarily in the context of 6 MHz RF channels, the present invention is applicable to literally any frequency/bandwidth, such as for example 8 MHz channels. Furthermore, as referenced above, the invention is in no way limited to traditional cable system frequencies (i.e., below 1 GHz), and in fact may be used with systems that operate above 1 GHz band in center frequency or bandwidth, to include without limitation so-called ultra-wideband systems. Additionally, the invention is in no way limited to any particular modulation type or medium access scheme, and can be implemented using for example using QAM, orthogonal frequency division multiplexing (OFDM), sigma-delta modulation (SDM), time-division multiplexing (TDM), etc.

FIG. 1 illustrates a typical content-based network configuration with which the anticipatory network control and operation methodology of the present invention may be used. The various components of the network 100 include (i) one or more data and application origination points 102; (ii) one or more content sources 103, (iii) one or more application distribution servers 104; (iv) one or more VOD servers 105, and (v) consumer premises equipment (CPE) 106. The distribution server(s) 104, VOD servers 105 and CPE(s) 106 are connected via a bearer (e.g., HFC) network 101. A simple architecture comprising one of each of the aforementioned components 102, 104, 105, 106 is shown in FIG. 1 for simplicity, although it will be recognized that comparable architectures with multiple origination points, distribution servers, VOD servers, and/or CPE devices (as well as different network topologies) may be utilized consistent with the invention. For example, the head-end architecture of FIG. 1a (described in greater detail below) may be used.

The data/application origination point 102 comprises any medium that allows data and/or applications (such as a VOD-based or "Watch TV" application) to be transferred to a distribution server 104. This can include for example a third party data source, application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill.

The application distribution server 104 comprises a computer system where such applications can enter the network system. Distribution servers are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other locations, whether local or remote to the distribution server 104) that can be accessed by a distribution server 104. Such CPEs 106 comprise processors and associated computer memory adapted to store and run the downloaded or resident application, as well as receive the streamed in-band content. For example, "Watch TV" or similar applications or their components (or updates thereto) of the type described subsequently herein with reference to FIG. 6 can be downloaded to the CPE as required. For example, co-owned and co-pending U.S. patent application Ser. No. 10/655,655 filed Sep. 5, 2003 and entitled "Technique For Updating A Resident Application And Associated Parameters In A User Terminal Through A Communications Network", incorporated herein by reference in its entirety, describes one exemplary technique and architecture for updating applications resident on network CPE.

Figure 1A:
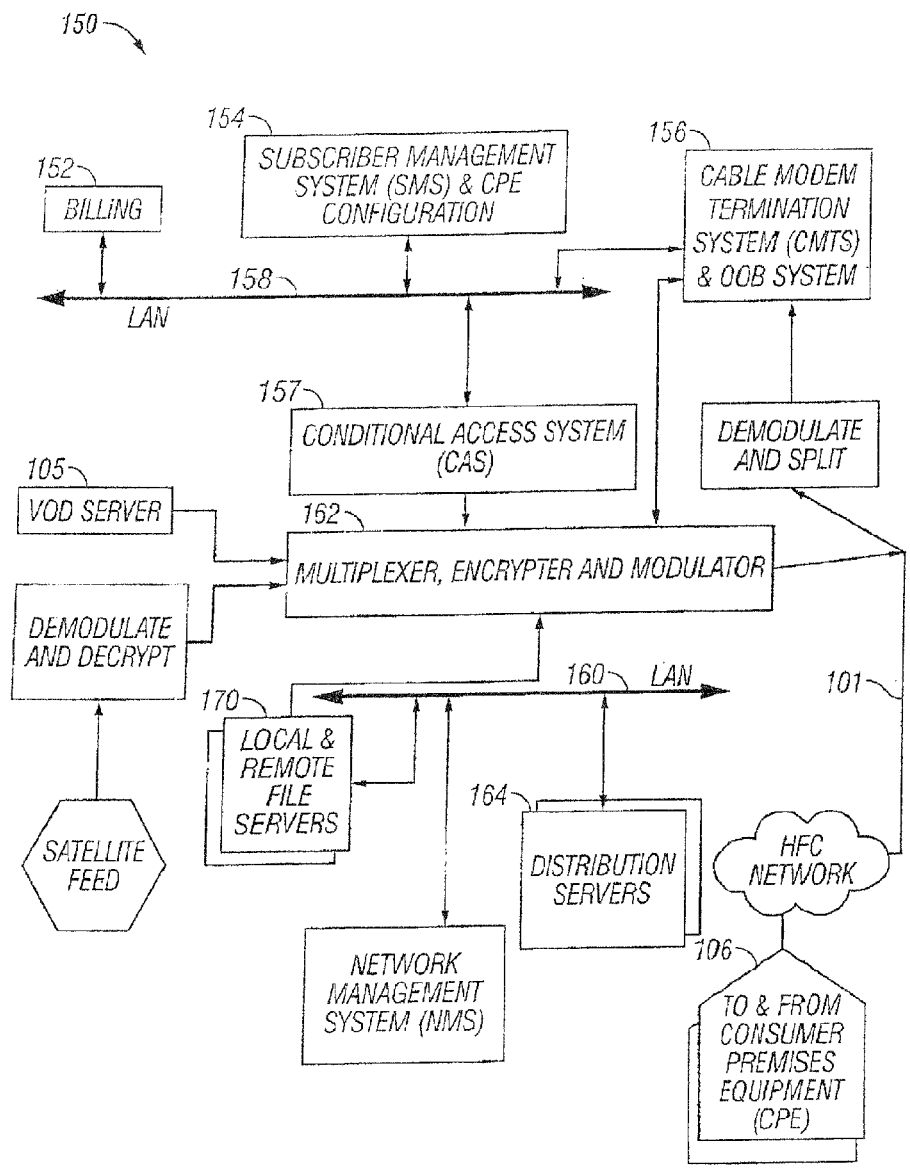
FIG. 1a is a functional block diagram illustrating one exemplary HFC cable network head-end configuration useful with the present invention.

Referring now to FIG. 1a, one exemplary embodiment of a head-end architecture useful with the present invention is described. As shown in FIG. 1a, the head-end architecture 150 comprises typical head-end components and services including billing module 152, subscriber management system (SMS) and CPE configuration management module 154, cable-modem termination system (CMTS) and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the invention. It will also be appreciated that the head-end configuration depicted in FIG. 1a is high-level, conceptual architecture and that each MSO may have multiple head-ends deployed using custom architectures.

The architecture 150 of FIG. 1a further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 160 as well, although other architectures may be employed (such as for example where the VOD servers are associated with a core switching device such as an 802.3z Gigabit Ethernet device). As previously described, information is carried across multiple channels. Thus, the head-end must be adapted to acquire the information for the carried channels from various sources.

Typically, the channels being delivered from the head-end 150 to the CPE 106 ("downstream") are multiplexed together in the head-end and sent to neighborhood hubs (FIG. 1b) via a variety of interposed network components.

Content (e.g., audio, video, etc.) is provided in each downstream (in-band) channel associated with the relevant service group. To communicate with the head-end or intermediary node (e.g., hub server), the CPE 106 may use the out-of-band (OOB) or DOCSIS channels and associated protocols. The OCAP 1.0 (and subsequent) specification provides for exemplary networking protocols both downstream and upstream, although the invention is in no way limited to these exemplary approaches.

In another embodiment, the network infrastructure includes one or more on-demand file or "carousel" functions. The present invention contemplates that not only will more traditional movie (e.g., MPEG) broadcast data be delivered though the boundary enforcement/targeting/resource allocation mechanisms described herein, but also data for interactive applications or other types of applications.

It will also be recognized that the multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

Contention for available edge QAM resources between these various servers can also be arbitrated via the mechanisms described herein. For example, contention for edge QAMs can be arbitrated between the BSA and VOD subsystems of the network. It will be recognized that these contending subsystems may have different operational paradigms as well. For example, the aforementioned exemplary BSA system is in effect a real-time system, whereas the VOD system is not. Hence, the present invention provides a mechanism for arbitrating these resources that avoids the difficulties of other approaches *such as, e.g., trying to arbitrate on a "session" basis.

"Switched" Networks—

Figure 1B:
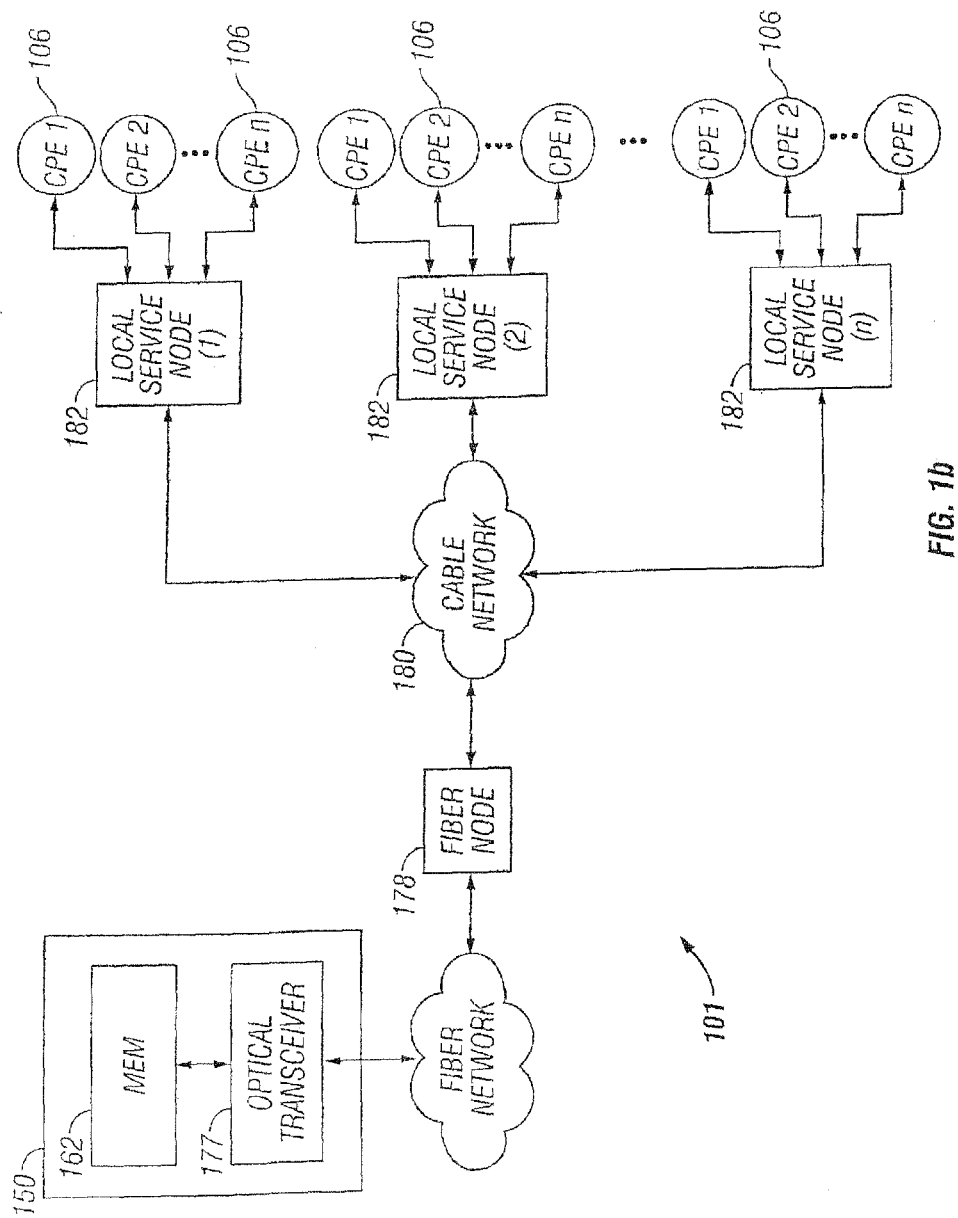
FIG. 1b is a functional block diagram illustrating one exemplary local service node configuration useful with the present invention.
Figure 1C:
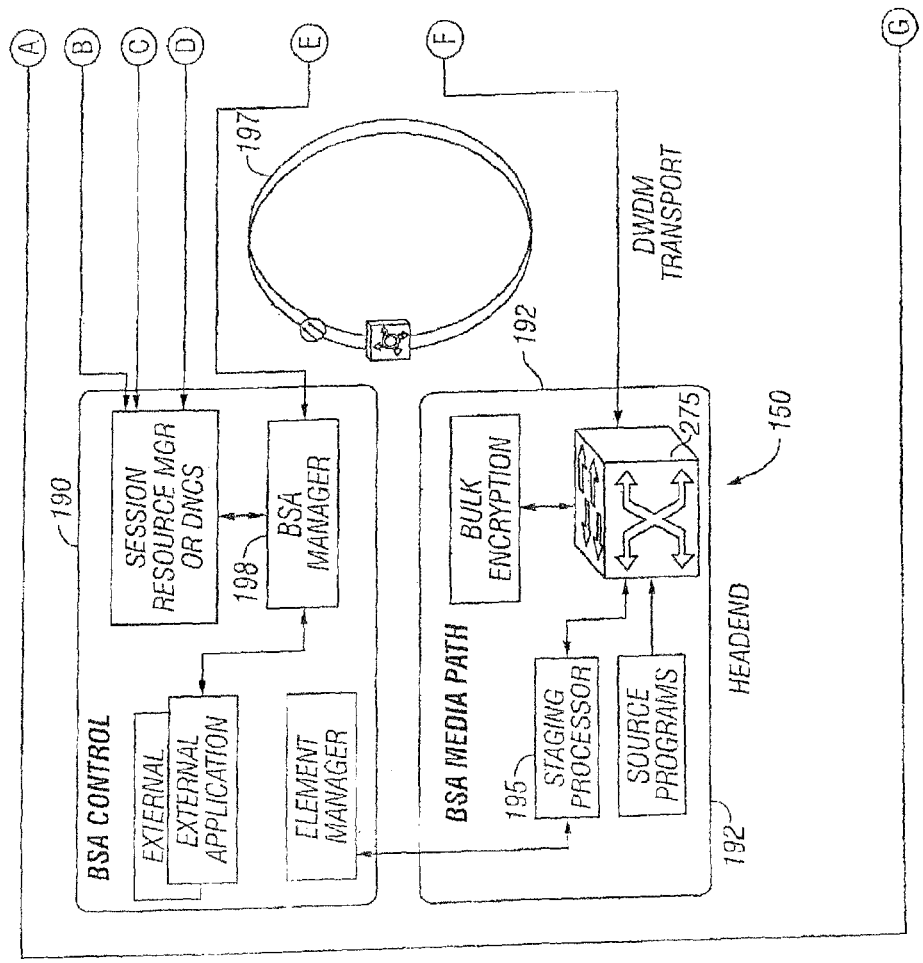
FIG. 1c is a functional block diagram illustrating one exemplary broadcast switched architecture (BSA) network useful with the present invention.
Figure 1C:
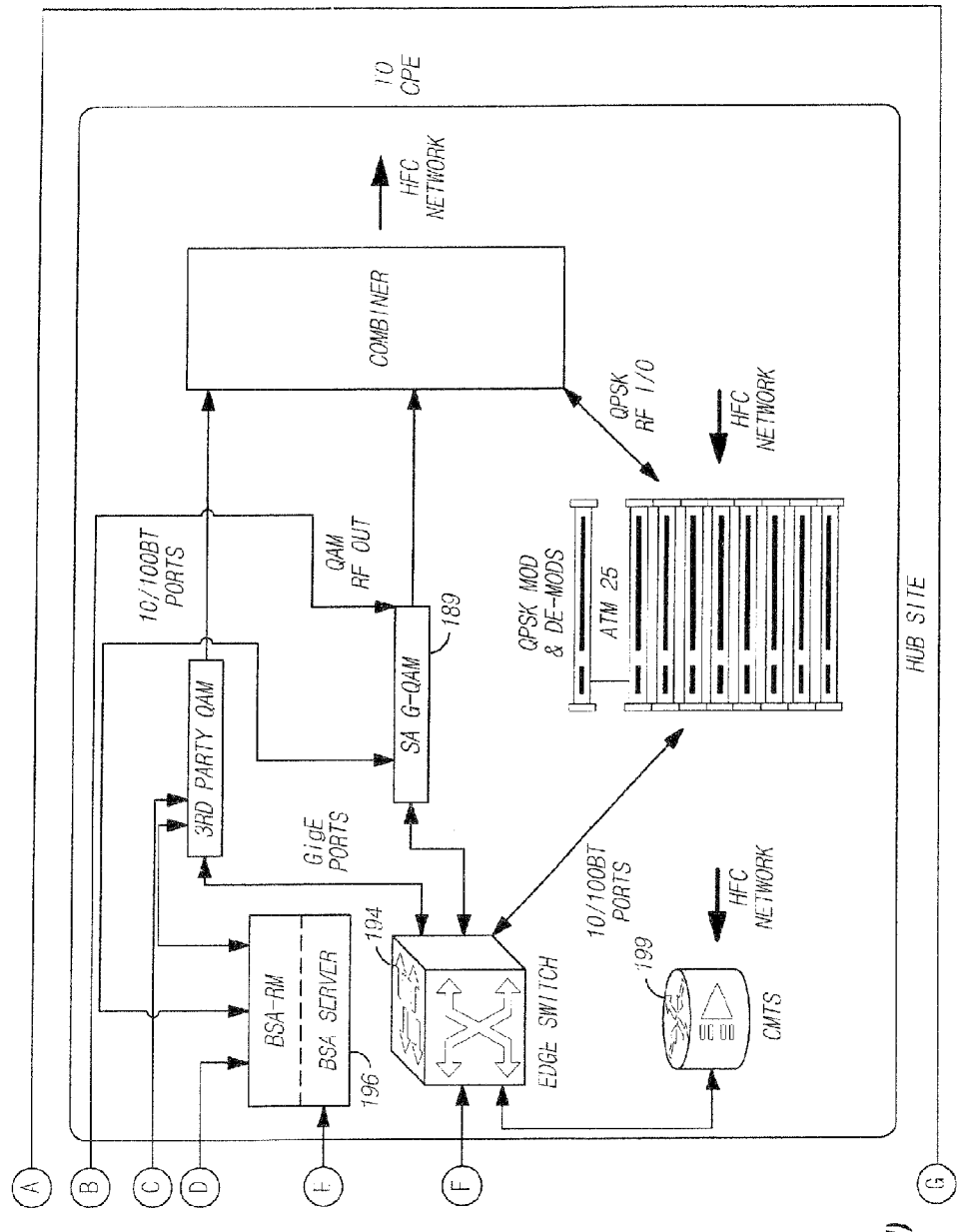

FIGS. 1b and 1c illustrate an exemplary "switched" network architecture useful with the present invention. While a so-called "broadcast switched architecture" or BSA network is illustrated in this exemplary embodiment, it will be recognized that the present invention is in no way limited to such architectures.

Switching architectures allow improved efficiency of bandwidth use for ordinary digital broadcast programs. Ideally, the subscriber will be unaware of any difference between programs delivered using a switched network and ordinary streaming broadcast delivery.

Specifically, as shown in FIG. 1b, the network 101 of FIGS. 1 and 1a comprises a fiber/coax arrangement wherein the output of the MEM 162 of FIG. 1a is transferred to the optical domain (such as via an optical transceiver 177 at the head-end or further downstream). The optical domain signals are then distributed to a fiber node 178, which further distributes the signals over a distribution network 180 to a plurality of local servicing nodes 182. This provides an effective 1:N expansion of the network at the local service end.

FIG. 1c shows the implementation details of one exemplary embodiment of this switched digital network architecture. Specifically, the head-end 150 contains switched broadcast control and media path functions 190, 192; these element cooperating to control and feed, respectively, downstream or edge switching devices 194 at the hub site which are used to selectively switch broadcast streams to various service groups. A BSA server 196 is also disposed at the hub site, and implements functions related to anticipatory switching and bandwidth conservation (in conjunction with a management entity 198 disposed at the head-end) as discussed subsequently herein. An optical transport ring 197 is utilized to distribute the dense wave-division multiplexed (DWDM) optical signals to each hub in an efficient fashion.

Co-owned and co-pending U.S. patent application Ser. No. 09/956,688 filed Sep. 20, 2001 and entitled "Technique For Effectively Providing Program Material In A Cable Television System", incorporated herein by reference in its entirety, describes one exemplary switched digital architecture useful with the present invention, although it will be recognized by those of ordinary skill that other approaches and architectures may be substituted.

BSA programming may comprise, without limitation, simulcasts, interactive pay-per-view (IPPV), live sporting and other events, and other selected offerings. A set-top box (STB) or two-way Digital Cable Ready (e.g., CableCard) television is required for viewing.

In order for the BSA function to be transparent to the subscriber, channel change latencies must be kept to a minimum (e.g., 250 ms or less as compared to average linear digital broadcast services). Like video-on-demand (VOD) systems, BSA programs are streamed to a service group (contrast: switch) only when being viewed. Unlike VOD, many viewers can view the same stream. Typically, only real-time linear programs are included in BSA broadcasts. Since there is no storage involved, the "VCR" controls (e.g., trick mode functions) common to VOD are not available. In this regard, BSA is much simpler that VOD. Commercials or other programming segments cannot be skipped, and program bit rates can be treated as in more conventional systems.

In the context of the aforementioned BSA network, there are several metrics or indices which are useful in evaluating the performance of the network. Specifically, the expression "peak streams" represents the maximum number of different program streams that are instantaneously (based on specified data intervals) needed. Using software, peak stream requirements can be analyzed for each group size. It has been noted by the Assignee hereof that generally speaking, as service group size is decreased, peak stream needs also decrease. When viewed over a sufficiently short time scale (e.g., two hour periods), it is possible to compare the moment-to-moment variability in peak stream use. Note that the physical network topology (which determines service group size) can also be modified, and is expected to migrate towards smaller groups of subscribers over time.

It has also been noted that the smaller service groups display roughly the same variability as the larger service groups down to a certain threshold size. When considered as a percentage of maximum stream use, as service group size decreases beyond this threshold, variability increases, and will impose a limit the amount of concentration that can be safely implemented within the system. Concentration in the context of BSA networks is defined as a ratio of the total bandwidth of the programs offered, to the BSA bandwidth provided to the service group. While this is conveniently expressed as a ratio of stream counts, in practice streams will be of various bit rates; concentration is therefore best thought of as the ratio of the bitrates. Concentration generally (at a given grade of service or blocking frequency) trends upwards with decreasing service group size.

Another useful metric of the value of BSA is yield. Yield is a function of concentration and the total number of programs included. Yield is important to consider when comparing the value of various bandwidth reclamation techniques.

As verified by actual trials conducted by the Assignee hereof, BSA provides significant concentration, which results in the ability to vacate significant portions of the previously occupied bandwidth ("free" bandwidth yield).

Also of interest is the metric of "redundant viewership". Redundant viewers are those which view otherwise unique programs. Generally speaking, the highest number of redundant viewers occurs at prime-time or just post prime time. This is also the time of greatest total viewership and the time of highest peak stream needs. A design point of X streams would provide a non-blocking grade of service; however, however, significant surplus bandwidth still exists below the X-stream level. Unfortunately, the greatest surpluses occur at times when other services (e.g., VoD) also have their lowest demands. Edge QAM resource sharing with VoD is therefore not expected to provide significant interleaving bandwidth gains. However, the BSA system can be advantageously operated to allow this surplus bandwidth to be utilized in other ways, such as for transport of data, video, voice, or even future applications which would require additional bandwidth.

Gain is a useful parameter for comparison of BSA with statistical multiplexing technology. In BSA, percent gain is defined as:

$$(\text{Concentration}-1) \times 100 \qquad \text{Eqn. (1)}$$

In this context, content that occupies the "freed up" spectrum is assumed to operate with the same level of efficiency as the content being processed (i.e. switched under the BSA architecture, or alternatively statistically multiplexed).

A primary advantage of the BSA paradigm is bandwidth conservation/preservation. Bandwidth for unviewed programs is not consumed, and can be re-allocated. Similarly, new programs can be added without adding bandwidth. Advantageously, programs with narrow appeal can be added in a BSA system with little if any bandwidth impact. More popular programs will impact the BSA bandwidth, but to a lesser extent than was traditionally the case. Multiple bit rates can also be made available for use or sale to programmers or advertisers.

BSA bandwidth efficiencies are at least in part a result of over-subscription. Specifically, the selection of programming is greater than the bandwidth allocated to the service group. This can result in blocking, the case where a viewer is denied access to a requested program. However, the aforementioned trials conducted by the Assignee hereof demonstrate that when properly configured, blocking events are sufficiently rare, so as to be less common than a network outage, thereby providing a sufficient level of service.

Additionally, a BSA system typically gathers and keep logs or other records of programmer-specific viewership data. For example, the BSA server gathers logs that are based on the client-server interactions. These logs or records are maintained to allow for well-considered "recapture" of non-viewed program streams (i.e., reclamation of bandwidth). The server manages bandwidth by removing streams based on this activity data. In typical practice, unviewed streams will be marked, but not actually removed until the bandwidth is needed either because of a client request, or based on external resource demands such as VOD overflow.

In one exemplary embodiment, the network session manager (BSA manager) logs all channel change events and is aware of the tuning locations of all tuners, not just those that happen to be viewing BSA programs. This provides highly accurate and complete viewership data based on actual channel changes as contrasted with extrapolations or other estimation techniques.

It is an important aim of the present invention to maintain subscriber privacy, for both legal and commercial reasons. As discussed in greater detail subsequently herein, subscriber identities are optionally protected by hashing or encryption of the tuner address prior to logging and storage. The stored address and associated events are therefore not traceable to the user account. The resulting obscured tuner address is repeatable so the necessary tuning location and user activity tracking may be performed while still maintaining complete anonymity. Alternatively, all or portions of the user-specific (albeit anonymous) information may be stripped off before storage of the activity data within the historical database.

In the exemplary embodiment of the present invention, the edge switch 194 (generally located in the distribution hub as shown in FIG. 1c) is flooded with all available programs. This improves transport efficiency, because a simple unidirectional "drop and continue" protocol is performed at each hub location on a given optical transport ring 197. The concept of flooding also simplifies the transport network in that no control system is needed; rather a simple "deliver everything" paradigm is used. This approach also advantageously makes this portion of the signal chain more robust, since more complex control systems generally lend themselves to a higher operational failure rate.

Because ordinary broadcast programming is supplied using BSA, the transport network 197 needs to have a high degree of availability. In the exemplary embodiment, BSA program transport is supplied through a redundant, spatially diverse counter-rotating Ethernet ring topology, although other topologies may be utilized with success.

Methods—

Figure 2:
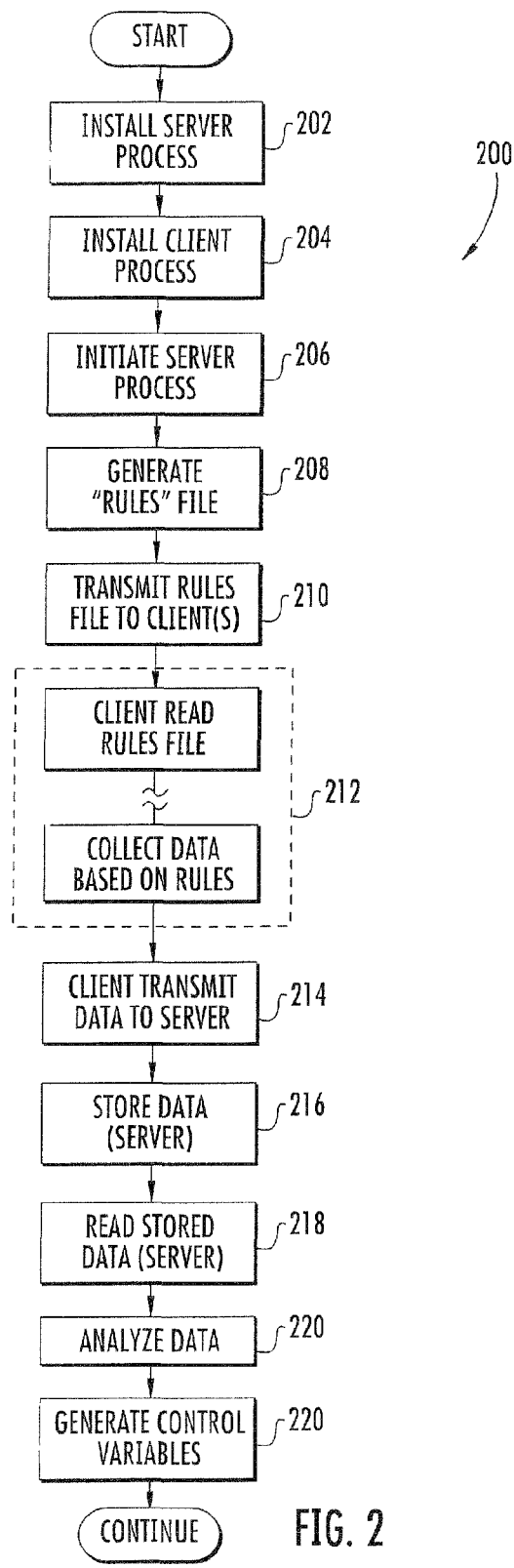
FIG. 2 is a logical flow diagram illustrating one exemplary embodiment of the method of operating a content-based network using anticipatory control according to the present invention.
Figure 2A:
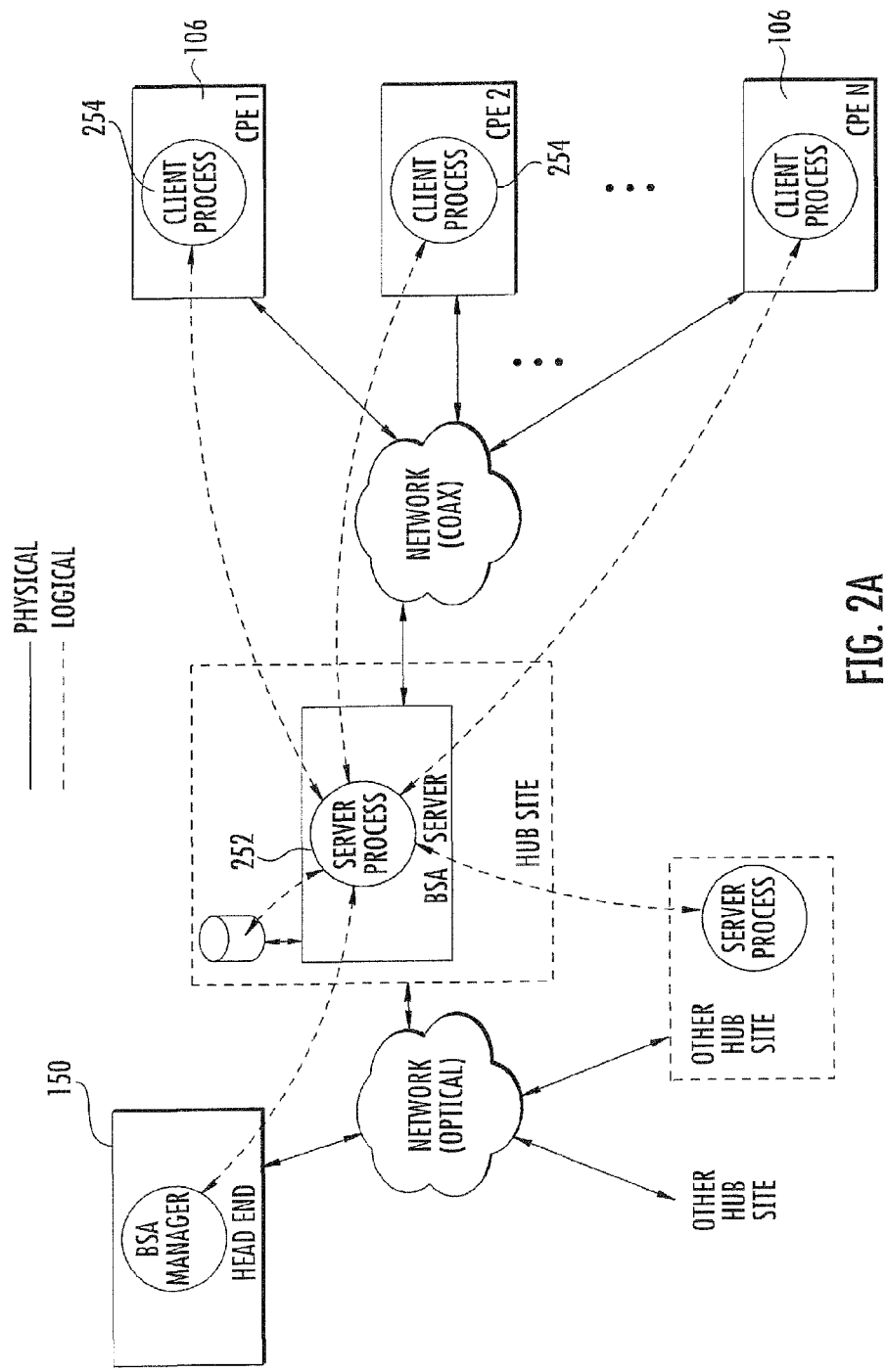
FIG. 2a is a graphical representation of an exemplary hardware/software architecture implementing the functionality of the invention.

Referring now to FIGS. 2-2a, one exemplary embodiment of the method of operating a content-based network using anticipatory control according to the present invention is now described.

As shown in FIG. 2, the method 200 comprises first disposing a server process 252 on a server within the network (step 202). In the exemplary embodiment, this server comprises the BSA server 196 disposed at the hub site (see FIG. 1c), although it will be recognized that the selected server may literally comprise any server or device in communication with the BSA server (such as, e.g., a VOD server 105, content server 103, application server 104, third party proxy server, and so forth).

Per step 204, a corresponding client process 254 is disposed on one or more of the CPE 106 of the network. The client and server processes or entities 254, 252 may comprise independent stand-alone applications, or alternatively parts of a distributed application (DA) of the type well known in the programming arts (see FIG. 2a). Intrinsic in this step 204 is installation of the client process on CPE that is in direct or indirect communication with the server process 252, since the two (or more) entities need to remain in at least intermittent communication with one another so that data gathered by the client process 254 can be forwarded to the server process 252. Accordingly, one or more application programming interfaces (APIs) are also provided within each process application to allow for, inter alia, communication with the other entity, communication with other remote processes, communication with the network operators (such as via a GUI), and so forth. The structure and implementation of distributed applications and APIs are well known in the programming arts, and accordingly not described further herein.

The client process application can be provided to the CPE 106 using any number of different methods including, for example, download via in-band downstream channel (e.g., pulled of a file carousel), via DOCSIS modem, via downstream OOB channel, during a maintenance or upgrade service call (e.g., by a technician with the application stored on a medium such as USB key or CD-ROM), via mailed medium (e.g., CD-ROM mailed to the subscriber and installed thereby), and so forth. The client application 254 may also be installed at time of manufacture of the CPE 106, and loaded at boot-up.

Next, per step 206, the server process 252 is initiated and receives programming inputs from the MSO or network operator as to the desired configuration. These inputs may be manually entered by the MSO/operator, or alternatively be drawn from one or more custom configuration files, each file for example providing a different set of configuration parameters that are optimized for different operating scenarios.

Per step 208, the server process 252 generates a "rules" file for the CPE 106 which will dictate how the CPE client process 254 will operate to collect data for the server process. In this regard, the client process 254 of the illustrated embodiment acts as the server process' proxy, in effect being a slave to the rules set forth by the server process 252. However, it will be recognized that the present invention may also be configured such that the client process 254 has varying levels of innate intelligence, thereby allowing it at least in some aspects to determine its own operational parameters. As one example, the server and client processes can be configured such that the client portions 254 are in effect distributed processing nodes, thereby relieving the server process 252 of some of its computational burden, especially in times of relative high loading of the server process 252. The client process 254 might, for example, process segments of the historical/anecdotal data it obtains from the CPE 106 or user remote control device (not shown) before sending this to the server process 252, in effect "pre-digesting" some of the information for the server process (as compared to merely sending raw or substantially unprocessed data to the server). Duration of viewing (obtained from analysis of raw switching data) might be one parameter that the CPE process could perform before transmission to the server process 252.

However, it will also be recognized that this approach can cause loss of some of the information gathered by the CPE, such as where the distributed processing performed by the CPE client process 254 is irreversible in nature (e.g., a filtration or truncation function). Hence, where the server process 252 (or the MSO/network operator) requires or desires to have all of the data possible in its raw form, such distributed processing by the CPE 106 can be disabled. It will also be appreciated that many CPE (e.g., DSTBs) are very "thin" in terms of storage and processing power, and hence they will be comparatively limited in their processing capability as compared to the server(s) within the network.

In generating the rules file, the server process 252 of the exemplary embodiment allows the network operator (e.g., MSO) to build a customized policy for how and what the corresponding client process 254 on the CPE 106 will send back to the server process. For example, the MSO can specify: (i) frequency of data gathering (which may range from continuous collection to merely a periodic or anecdotal/event-driven sampling basis); the (ii) interval or conditions upon which the collected data is sent back to the server process 252; (iii) the maximum or minimum size limitations for the data to be sent, and/or (iv) the type and content of the data sent back to the server process. Other "directives" may be generated by the server process (alone or in conjunction with MSO operator inputs) to form the rules file sent to the client(s) 254.

It is also noted that the configuration of the CPE 106 by way of the rules file may be subscriber/tuner-specific using, e.g., the anonymous subscriber identification methods and apparatus described in co-owned and co-pending U.S. patent application Ser. No. 11/186,452 filed Jul. 20, 2005 and entitled "METHOD AND APPARATUS FOR BOUNDARY-BASED NETWORK OPERATION", which is incorporated herein by reference in its entirety. Accordingly, the MSO (or server process 252 itself) can configure individual CPE 106 according to tuner-specific activity analysis gleaned from that particular CPE. For example, with a particularly egregious "channel hopper" in one residence, it may be desirable to have the CPE client process 254 collect and or transmit data at reduced intervals, so as not to unnecessarily skew the data coming from other CPE that are less active.

Per step 210, the server process 252 next transmits the rules file/message to the CPE (via any of the aforementioned communication channels) whereby it is received, stored (e.g., such as a policy table or other data structure), and ultimately read by the client process 254. This transmission may comprise transmitting via a packetized protocol existing within the system for downstream communications, such as MPEG2, DSM-CC, or any other mechanism suitable for the task. Some latency of delivery can be tolerated in this function, since the collection of data by the CPE 106 will occur over some period of time which is large as compared to the transmission/reception time of the rules file/packets.

Per step 212, the client process 254 reads the rules file/policy table and then (whether immediately or with some latency as dictated by the rules file) begins collecting data regarding the parameters of interest (described in greater detail below). In the exemplary embodiment, this activity is monitored according to a prescribed time interval, and the data collected includes (i) tuning activity on each network and the associated timestamp; (ii) remote control activity associated with each network; and (iii) CPE operational status, although it will be appreciated that other parameters may be monitored as well on a regular or irregular basis. For example, on initial startup, profiling data regarding the CPE 106 hardware software configuration may be gathered up and sent upstream. The methods and apparatus of U.S. Patent Application Publication No. 20020032754 to Logston, et al. published Mar. 14, 2002 entitled "Method and apparatus for profiling in a distributed application environment", incorporated herein by reference in its entirety, can be used for such a purpose, although other approaches may be used as well.

Similarly, types or patterns of behavior present in the tuning data can be monitored, such as e.g., "switch back" transitions (where the user changes a channel to a second channel, and then subsequently switches back to the original channel within a preset period of time), channel hopping (where the user changes channels above a prescribed threshold frequency), and so forth.

This information obtained by the client process 254 may be stored locally after collection, or alternatively streamed to another device such as a proxy server (or even the server process 252 itself) in real time if suitable communication bandwidth exists. Local storage may be desirable in some circumstances, since the use of upstream bandwidth can be timed coincident with periods of low upstream usage if desired, and the data is not ethereal; i.e., will not be lost if a transmission or processing error occurs. However, since the CPE 106 typically has only limited storage capability, only a finite amount of history is stored thereon in the illustrated embodiment, and this is written over by new data after successful receipt by the server process 252 (such as via an "ACK" message or other signaling) has been confirmed to the client process 254.

Next, the client software process 254 sends data to a corresponding server software process 252 (step 214). The server process monitors one or more aspects of the tuning or utilization activity relating to the CPE 106 via the transmitted data. The client process transmits, and the server process 252 stores, the collected data on a configurable time schedule or interval (which may also change as a function of time, network loading, or other parameters) in a log file or other such data structure. This data may be stored (step 216) locally on the relevant server device itself, or alternatively at a remote or central data storage facility.

In another embodiment, a polling mechanism of the type well known in the networking arts is utilized to obtain data from the various CPE 106 or other client devices. In this configuration, the relevant server 196 or other network node in communication with the CPE polls the CPE 106 via a short downstream polling message or other signal. This polling can be conducted periodically, or alternatively upon the occurrence of a given event (e.g., exceeding a certain loading in one or more portions of the network), deterministically, randomly/pseudo-randomly, or otherwise. This polling approach, however, adds some additional overhead to the downstream channels which is a function of the periodicity of the polling events, as well as the number of CPE being polled, message size, etc.

The upstream communication of data from the CPE to the relevant server (or proxy) may comprise a periodic, deterministic or random/pseudo-random scheme as well. It will be recognized, however, that the upstream and downstream schemes need not be symmetric. For example, in one variant, the downstream polling is performed as a function of downstream channel bandwidth, while the upstream response from the CPE is performed on an immediate basis (since upstream bandwidth is typically less constrained and of less significance).

Referring again to FIG. 2, the server process 252 then (or in parallel with storage) reads this data log file or structure according to the server process' configurable schedule/period (step 218), analyzes the data (step 220), and controls or optimizes one or more parameters associated with the network based thereon (step 222).

In the exemplary embodiment, the following parameters are selectively controlled (step 222) based on the analysis and evaluation of the stored log file data: (i) total stream pool size by service area; (ii) individual channel reclamation parameters; and (iii) individual channel "on" times, when excess bandwidth is available. Other parameters (whether derived from the sent CPE-derived data or otherwise) may be utilized alone or in conjunction with the foregoing, including without limitation peak streams, stream use variability, redundant viewership, gain, yield, and concentration (as previously described herein).

As a first example of the foregoing, a control parameter can be structured to query data type "channel requests" and data type "time of day" in order to anticipate a service group's subscriber channel requirements. This control parameter can be implemented to turn on video streams or events prior to a subscriber requesting the event, thus anticipating the request, and reducing any network latency in processing a request in real time. For instance, subscribers watch a different set of programming at night than in the morning; therefore, as groups of subscriber stop watching their evening programming and wake up in the morning and tune to other programming types, a significant number of new requests are required to be processed in a short period of time. However, using optimization mechanisms of the present invention, the programming would be "turned on" based on the control parameter, and prior to the request event, thus reducing real time processing requirements.

As another example, a control parameter can be structured to query data type "channel usage" and data type "time of day" in order to maximize bandwidth over a limited bandwidth network. The control parameter can be implemented to shape bandwidth usage over a period of time. In this manner, the control parameter can be used to anticipate periods of low expected video usage, and release pre-allocated bandwidth for use for other service such as Video-on-Demand. Conversely, the control parameter can also be used to anticipate increasing video demand, and request more bandwidth prior to a situation wherein a video subscriber is unable to receive programming due to a bandwidth limit.

Myriad other uses and configurations of control parameters within the network will be recognized by those of ordinary skill provided the present disclosure, the foregoing being merely exemplary.

To implement this optimization and control of the foregoing parameters (e.g., stream pool size, reclamation times, etc.), the sever process 252 of the present embodiment comprises a supervisory process that algorithmically evaluates the data sent back from the CPE 106 and client process(es) (i.e., the tuning activity, remote button activity, CPE etc.) to derive certain key performance values or metrics. In the exemplary embodiment of the invention, the data is collected from the CPE 106 on a per-device (e.g., per-DSTB) basis, and the "subscriber base" for purposes of statistics will, in the exemplary BSA network, be on the order of 200-400 digital subscribers. The BSA server 196 (with server process 252) performs its anticipatory control and allocation functions to this larger basis; i.e., it calculates statistics and makes anticipatory decisions based on the 200-400 subscribers, although other numbers of subscribers may be used for this purpose.

In one variant of the invention, the server entity 252 evaluates the various video streams based on the CPE data, and calculates the usage of a given stream. In the present context, "usage" refers to how often (frequency per unit time) a program stream is used by the relevant portion of the subscriber base, although other metrics or parameters can be used either alone or in combination with the foregoing. For example, in another variant, the usage is based on a particular program and duration (i.e., how long the stream was watched after tuning thereto by the user); e.g., Program A was watched for a duration of X hours, etc.

The usage is determined from the tuning activity; e.g., a log file or other such data generated by the DSTB resident application or client process within each individual CPE 106, and/or activity of the user's remote control, as captured by the client process 254 running on that CPE.

It will further be recognized that complex aggregations or functional relationships can be utilized as the basis for the "usage" metric. For example, in the context of the aforementioned frequency and duration parameters an aggregated or derived functional metric could be utilized, such as that of Eqn. (1):

$$U=(a \times F)+(b \times D)$$

Wherein:
U=utilization (dimensionless)
F=Frequency of usage (events/time)
a=frequency scaling or weighting constant
D=duration (hours)
b=Duration scaling or weighting constant Hence, when no uses of the program stream are made in a given interval of analysis (F=0), and hence there is no duration (D=0), then the utilization factor is zero (U=0). Likewise, the scaling constants can be adjusted such that when complete program duration is achieved (e.g., one hour duration for a one-hour program) so that parameterized values (e.g., U=maximum of 1.0) can be achieved if desired. Frequency and/or duration can also be implemented in a Fuzzy or other variable scheme (e.g., "high/medium/low" or "greater than X", "less than Y", etc.). Myriad other such relationships between two or more variables (including without limitation frequency of use, duration of use, (start) time, etc.) will be recognized by those of ordinary skill provided the present disclosure.

Other metrics that can be calculated by the exemplary server process 252 include (1) the values of the optimized parameters themselves (e.g., do they fall within prescribed limits or ranges); (2) the variance in parameters (e.g., how much does the aforementioned usage parameter vary as a function of date/time) (3) the selected period of historical or anecdotal data to use as the basis for parameter control; and (4) the frequency of control calculation and application of parameter adjustment rules (e.g., to avoid excessive "jitter" or hunting resulting from too frequent corrections by the system); and (5) any unusual data points, trends or patterns evident within the CPE data.

As can be appreciated, the degree of variability present in the CPE data (and hence actual usage patterns) for a given portion of the subscriber base can substantially affect the efficacy of the anticipatory approach. For example, at one end of the spectrum, a portion of the subscriber base that was perfectly consistent and predictable in its tuning habits (e.g., tuning to the same program every Thursday night at the same time for the same duration) would allow for the maximum degree of benefit from the anticipatory approach, since the relevant program streams could be instantiated precisely at that point in time, and then torn down precisely at program completion. Conversely, where there is no level of predictability or pattern to the tuning habits of the selected portion of the subscriber base, the benefits derived from the anticipatory approach would be minimal, since given the laws of chance (all else being equal), such anticipatory instantiations would be wrong just as many times as they would be correct.

Accordingly, the present invention makes use of three aspects of viewer tuning behavior that assist in identifying "patterns" upon which to base an anticipatory instantiation and tear-down profile: (i) the fact that the statistical behavior of the subscriber base as a whole (or subsets thereof) is generally substantially predictable; (ii) that the behavior of one or more individuals within the subscriber base may be substantially predictable; and (iii) the fact that certain events and dates/times generally lend themselves to certain types of behavior.

Regarding aspect (i), it will be recognized that significant variability may exists in the activities of a single user (or tuner), or even between two different individual users/tuners, but in general these variations will be "flattened out" when taking a larger statistical sample of the subscriber base. For example, a single viewer may simply have a very variable tuning pattern as a function of time, or be a "channel hopper". Similarly, others (whether geographically, demographically, psychographically, or logically related to the first user or not) may have similar patterns, or in fact completely different patterns.

However, when considered in the aggregate, the subscriber pool (or selected portion thereof) will generally exhibit behavior in terms of tuning which centers around a mean/ median. For example, the aforementioned tuning frequency parameter may have a mathematical mean of R times per day, and a median (i.e, half above and half below) of S, with the standard deviation ($\sigma$) or statistical variance ($\sigma^2$) being indicative of the spread of the distribution, or how variable the patterns are from user to user. Statistical analysis of populations such as the exemplary portion of the subscriber base described herein is well known in the mathematical arts, and accordingly not described further herein.

Regarding aspect (ii), certain individuals (or for that matter certain demographic/geographic/psychographic/logical slices of the subscriber pool) may exhibit very predictable or patterned behavior, which can also be identified by way of various mechanisms. For example, in one variant of the present invention, the server process 252 is adapted to utilize the anonymous hashed TUNER ID, TUNER USE or MAC ID variables set forth in co-owned and co-pending U.S. patent application Ser. No. 11/186,452 entitled "METHOD AND APPARATUS FOR BOUNDARY-BASED NETWORK OPERATION previously incorporated herein. This application discloses, inter alia, the ability to individually and specifically target user CPE (e.g., their tuner stages) within portions of the network, so that virtual boundaries or subsets within the subscriber base are formed, such as where subscribers in different geographical regions require different programming. Specifically, in the context of the present invention, the server historical database can be maintained on a per-user basis if desired, with entries in the database being logically coupled to a specific subscriber's hashed TUNER ID, etc. In this way, the MSO can maintain anonymous historical data on a given subscriber's tuning habits, which can then be used by the server process 252 to adjust its behavior. For example, if the subscriber associated with hashed TUNER ID 1011101011001101 (exemplary binary hashed format) religiously views a certain program every Thursday night at 9:00 pm, this information can be used by the server process in its anticipatory decisions on bandwidth allocation or program delivery to the hub servicing that subscriber/TUNER ID. One such use may comprise segregating or grouping such users into a given service group, which would characteristically have very low variability.

Similarly, if the MSO (via the server process 252) determines that no one served by a given hub ever watches a certain program between the hours of 9:00 and 12:00 pm on Thursday, then the server can anticipatorily not deliver this program stream to the switch 194, thereby making room for other streams more in demand during that period.

Regarding aspect (iii), one example of such event- or date-driven activity is the so-called "Mother's Day effect"—larger than normal changes in viewer behavior are observed coincident with certain holiday or other events/dates. Specifically, the Assignee hereof has observed large spikes in user activity on the day after a holiday, potentially correlating with many people "looking for something to do" on those days since their presence may not be required at work, etc. Such effects tend to increase gain goes since subscribers are often watching the same programming, thereby "sharing" QAM resources.

It will also be recognized that while the exemplary embodiments of the invention are described in terms of a statistically based approach (e.g., the behavior of a plurality of CPE within a selected network), one or more network parameters can be adjusted or optimized based on per-user/per-CPE data using the foregoing CPE "targeting" capability. For example, in the context of the aforementioned "channel hopper", it may be desirable to set the individual channel bandwidth reclamations times for that specific tuner/user to a longer value, since there is a higher likelihood that this user will hop back to one of the channels that he/she was previously viewing.

It will be recognized that intrinsic to the techniques of the present invention is the gathering and retention of significant amounts of historical data from the CPE (and network as a whole). This is contrast to the prior art, which gathers data and then discards it after a period of time. By gathering and retaining the data, the present invention allows the MSO or other network operator to build an ever-growing and continually changing historical database which is used by the "artificial intelligence" of the server process 252 to provide the desired level of anticipatory control.

From the standpoint of continual growth of the CPE-derived database, the statistics of the database become better with time. Consider for example, the difference in statistical reliability of one or two data points versus several thousand or million. Stated differently, the variability in the trends or behavior reflected in the data (when considered as a whole) will decrease as the database grows.

From the standpoint of adaptability, the continual compilation of data allows for a dynamic result; changes in viewer tuning habits being reflected in the data in a smoothed fashion (as opposed to trying to divine trends from a few data points).

However, it will also be recognized that as the database grows, the weight or effect that one new data point has on the overall statistics will progressively decrease. Hence, where rapid changes in the viewership habits occur (such as during the time of a national tragedy or onset of a war, when many more people tune to news programs as compared to other types of programming), the system must be able to rapidly detect and adapt to such behavior, since the statistics will be somewhat latent in catching up, especially where the volume of historical data used for the basis of the anticipatory control decision is large. Hence, the present invention also advantageously makes optional use of a "moving window" for data; e.g., analyzes only the last Y days of data, and compares this result to that based on a larger statistical sampling. This approach is particularly useful in the case of sui generis events (e.g., aliens visiting earth) for which no reliable or prior history of viewer behavior exists. Furthermore, the character of viewer tuning behavior may change during certain events; e.g., in the case of natural disasters, plane crashes, wars, etc., viewers may "hop" between channels much more frequently, trying to gather as much information from multiple different sources (e.g., different news programs) as possible in a short period of time.

In one embodiment, the data evaluated under a short (e.g., Y day) moving window is compared to that of a substantially longer window (or the entire historical database as a whole) to identify a "variance" between the two (which may or may not be correlated to a statistical variance of the type previously described), such variance prospectively indicating the presence of a rapid change in viewer habits. For example, in one simple model, the tuning behavior for N viewers can be evaluated for a given program stream in terms of the aforementioned time and duration of tuning variables, for both the short and long windows. In the viewer's behavior during the short window is within a given range (e.g., Q percent) of that indicated by the longer window, then the viewer's current behavior is assumed to be within "normal" variance levels. These normal levels can be determined by examination of the historical database as a whole, for example.

However, where there is a significant departure from the "normal" variance levels, the MSO is alerted that a prospective significant change in viewer behavior is taking place. In response, the MSO might for example: (1) temporarily decrease the duration of the moving "short" window to increase the granularity of their analysis; (2) consult secondary or confirmatory sources of information to attempt to validate the departure; (3) change the size and/or makeup of the subscriber pool which they are sampling to see if the departure is a more geographically, demographically, or psychographically localized phenomenon; and so forth.

Regarding Item (3) above (change is subscriber pool), the techniques described in U.S. patent application Ser. No. 11/186,452 entitled "METHOD AND APPARATUS FOR BOUNDARY-BASED NETWORK OPERATION", previously referenced and incorporated herein, are particularly useful. Using this approach, the MSO or other network operator can, in the context of the present invention, readily adjust the selected subscriber base from which it gathers data based on geography, demographics, and/or psychographics, all in a completely anonymous fashion. This capability provides the MSO with a sophisticated tool by which they can examine individual "slices" of the subscriber pool in an anonymous and substantially real-time fashion to better evaluate prospective anticipatory program stream shaping by the intelligence algorithms of the server process 252.

For example, if all (or most all) subscribers within a given geographic locale that are served by say, two different hubs in total exhibit certain viewing or tuning patterns on a regular basis (e.g., never watch program or user channel P on Thursday nights because it deals with a geographic region not germane to these subscribers), then the server process 252 can avoid switching this channel stream to these hubs, thereby conserving resources for other uses.

Herein lies another salient advantage of the present invention when used in conjunction with a BSA network, and the aforementioned individual CPE "targeting" capability; namely, the ability to plan future service grouping allocations of subscribers based on historical usage or tuning patterns. As an illustration, consider an exemplary neighborhood with six premises (e.g., Homes 1-6) sharing the same coaxial drop from a node, with edge QAMs feeding BSA modulated signals to all of the homes. Since these six homes share the same RF downstream signal, they form a service group sharing the relevant portion of the RF spectrum. Further, assume that homes Home 2, Home 4 and Home 6 belong to a different programming neighborhood (e.g., the "Westside" area) and Home 1, Home 3 and Home 5 belong to another programming area (e.g., "Eastside"). Since these six homes share the same RF spectrum, the only way to eliminate BSA channel tuning of a home in the Eastside area (say Home 1) so as to impact the available BSA bandwidth pool under the prior art is to split the node into two nodes—one dedicated to the Eastside homes and the other dedicated to the Westside homes. This is resource "expensive", because even for BSA channels shared by the Eastside and Westside homes (which before splitting were using the same edge QAMs), two separate transmissions must now be made.

In contrast, by using the techniques of the present invention in the BSA context, the homes can advantageously be allocated to different service groups. BSA channels commonly shared will still be transmitted to the service group of all six homes by the relevant switch 194. However, for the purpose of a geographically, demographically or psychographically heterogenous programming, the two sets of homes (Eastside and Westside) can be grouped into differing (two) service groups. Based on the past viewing history, these groups could be determined to have a different bandwidth/program behavior.

It is noted that the generation of the rules file or messages by the server process 252 as previously described with respect to FIG. 2 may also be substantially iterative in nature, and/or the result of assessments of the efficacy of the last "cycle" of control parameters inserted into the system. For example, the server process algorithms may, based on the analysis of the historical data and other existing operational settings for the network at that time, call for an adjustment to a parameter (e.g., reclamation time) of a certain percentage or absolute amount. Once this control adjustment is inserted into the system, and the requisite change in reclamation time made, the server process 252 may then examine the data coming from the CPE 106 during subsequent sampling increments (i.e., shorten its analysis window to only the last few data points or brief period of time after the control adjustment was made) in order to evaluate the efficacy of the change. This evaluation may be conducted by, e.g., seeing if the anticipated or speculative behavior in the subscriber pool (or subset thereof) actually manifests itself. For example, an anticipatory control might be to reduce reclamation times down to a very low amount beginning at a prescribed time of day, thereby reclaiming any available bandwidth as fast as possible (where demand is expected to be high on that day). However, the actual bandwidth demands might be far less than those anticipated under a "worst case" scenario. Hence, such contracted reclamation times (which can impact other network operational aspects) may not be needed, and can be backed off in a subsequent control signal insertion to a more appropriate value. In this way, the anticipatory approach of the invention is substantially adaptive and self-healing (i.e., able to adjust for flaws in its own recommendations).

It will also be noted that the anticipatory control or shaping used by the present invention need not be (and in fact optimally is not) applied in an absolute or "all or nothing" fashion. Herein lies another salient advantage of the exemplary broadcast switched architecture (BSA) when used in conjunction with the invention. Specifically, the anticipatory control or shaping can be used on a statistical basis itself, recognizing full well that there may be cases where the user tuning/behavior statistics or anecdotal data upon which it bases its anticipatory control decisions won't hold up. For example, if historical data shows that program channel P is never watched by the subscribers associated with certain hubs on Thursday nights, and the server process 252 accordingly prevents switching of this program stream to the relevant hubs during this period, then a subscriber that does decide to watch channel P during this time can simply have that stream switched into their hub on demand from the tuning event, effectively in a seamless and transparent fashion to the subscriber as if the content had been switched to their hub all the while. This is accomplished solely using the capabilities intrinsic to the BSA. However, in those instances where the anticipatory shaping algorithm does "guess correctly" (which is presumed through statistical analysis to be most of the time), no switching or instantiation of program channel P is required. Stated simply, there's really no significant penalty for an incorrect guess once in a while by the server process 252, while there are significant benefits (in tuning latency and in the ability to tune desired programs in the absence of the closed loop control system) for correct guesses most of the time. Furthermore, if the network operator can populate the required channels before requested by the subscriber, channel tuning can be conducted without having to complete an upstream communication from the CPE to the relevant BSA server, thereby reducing tuning latency and message overhead in the upstream direction, and increasing robustness.

It will be appreciated that while the exemplary embodiments are described herein with the aforementioned server process 252 disposed at the BSA server 196, the anticipatory control functionality (server process) can placed at different locations within the network system, such as to a VOD server 105 or application server 104 (see FIG. 1*a*), or otherwise. This placement can be used to support arbitration of resource contention between these services (e.g., VOD and BSA). Hence, the present invention contemplates arbitration between the broadcast switched (BSA) and other delivery paradigms within the network, as well as control of the operation of the BSA system itself.

Additionally, it will be recognized that the bandwidth optimization and anticipatory "shaping" functions provided by the server process 252 need not be conducted on a localized region of the network (e.g., hub(s) servicing 200-400 subscribers as previously described), but rather may also be applied more globally. For example, in one alternate embodiment, the "local" network data (e.g., that obtained from CPE associated with individual hubs serving portions of the BSA network) is also propagated upstream to one or more higher layers of abstraction within the network, such as a supervisory or global server process at the head-end 150), so as to permit larger scale network analysis and optimization, as opposed to the more local shaping performed by the BSA server 196 and server process 252 in the illustrated embodiments.

It will also be appreciated that the anticipatory and automatic network operation of the present invention can be used in both single- and multi-stage statistical multiplexing environments. For example, co-owned and co-pending U.S. patent application Ser. No. 11/048,334 filed Feb. 1, 2005 entitled "APPARATUS AND METHODS FOR MULTI-STAGE MULTIPLEXING IN A NETWORK", which is incorporated herein by reference in its entirety, describes one exemplary multi-stage statistical multiplexing architecture useful with the present invention. Others may be used as well, as will be recognized by those of ordinary skill in the art provided the present disclosure.

Network Server—

Figure 3:
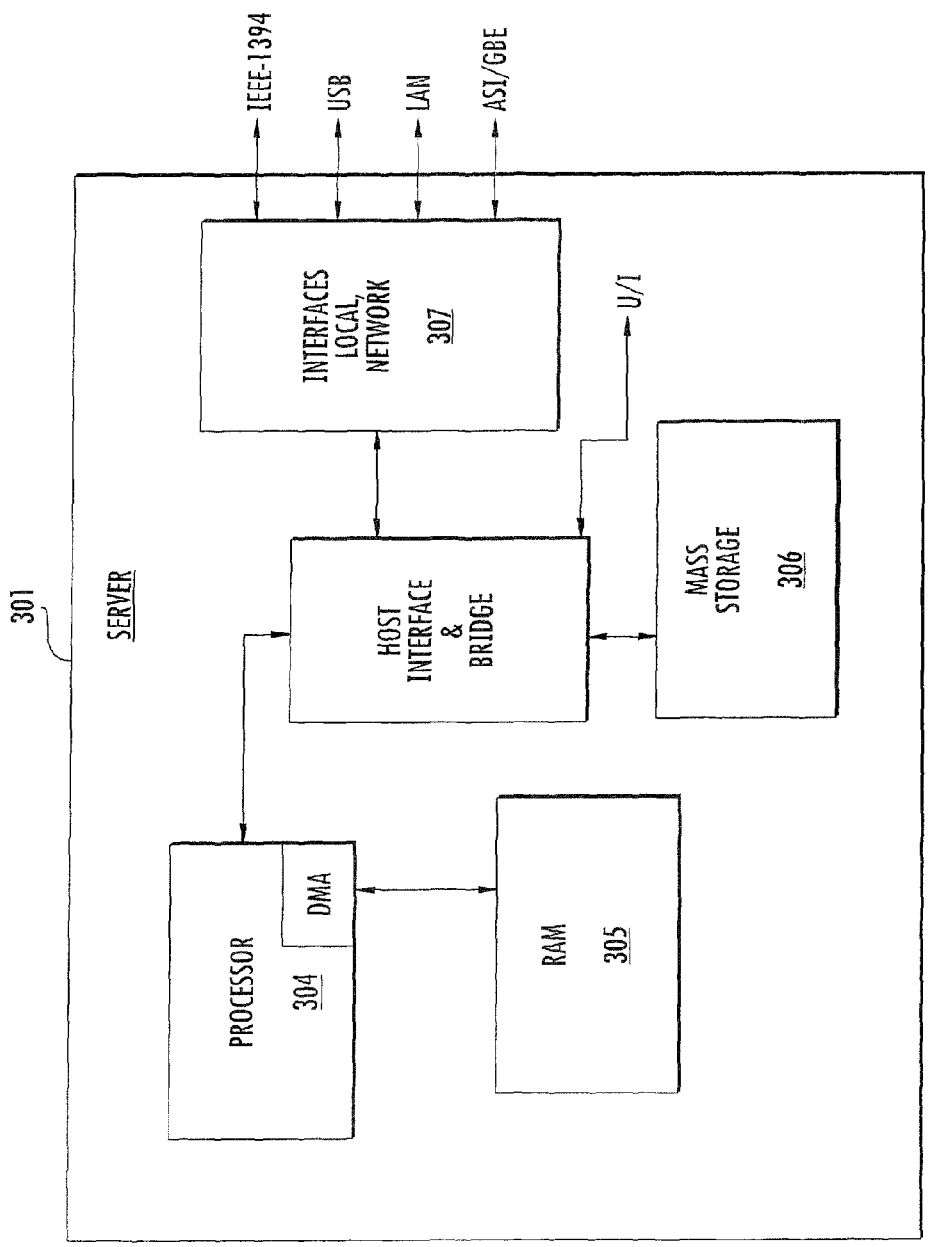
FIG. 3 is a functional block diagram illustrating an exemplary network server device with anticipatory control functionality according to the invention.

Referring now to FIG. 3, one embodiment of the improved network server device with anticipatory bandwidth control and optimization capability according to the present invention is described. As shown in FIG. 3, the device 301 generally comprises and OpenCable-compliant BSA network server module 196 adapted for use at the hub site of FIG. 1*c*, although the server may comprise other types of devices (e.g., VOD or application servers) within the network as previously described.

The server 301 comprises a digital processor(s) 304, storage device 306, and a plurality of interfaces 307 for use with other network apparatus such as QAM combiners, IP routers and other packet network devices, network management and provisioning systems, local PCs, etc. Other components which may be utilized within the server device 301 include amplifiers, board level electronic components, as well as media processors and other specialized SoC or ASIC devices. Support for various processing layers and protocols (e.g., 802.3, DOCSIS MAC, OOB channels, DHCP, SNMP, H.323/RTP/RTCP, VoIP, SIP, etc.) may also be provided as required, such as in support of data and "rules" interchange between the server 301 and the CPE. The server process application 252 is also disposed to run on the server module 301 to provide a functional interface with the client process 254 on the network CPE 106, or other interposed entities. These components and functionalities are well known to those of ordinary skill in the cable and embedded system fields, and accordingly not described further herein.

The server device 301 of FIG. 3 may take any number of physical forms, comprising for example one of a plurality of discrete modules or cards within a larger network edge or hub device of the type well known in the art. The server may also comprise firmware, either alone or in combination with other hardware/software components such as those previously described (e.g., disposed in the aforementioned edge device). Alternatively, the server module 301 may be a stand-alone device disposed at the hub or other site, and may even include its own RF front end (e.g., modulators, encryptors, etc.) or optical interface so as to interface directly with various portions of the HFC network 101. Numerous other configurations may be used. The server device 301 may also be integrated with other types of components (such as satellite transceivers, encoders/decoders, etc.) and form factors if desired.

It can also be appreciated that the methods of the present invention may be practiced using any configuration or combination of hardware, firmware, or software, and may be disposed within one or any number of different physical or logical entities. For example, the data receipt, analysis, and control parameter generation functionality described above may take the form of one or more computer programs (e.g., the server and client processes, 252, 254). Alternatively, such computer programs may have one or more components distributed across various hardware environments at the same or different locations, such as where the server process 252 is distributed across multiple platforms at the hub site and the head end 150.

As yet another example, portions of the functionality may be rendered as a dedicated or application specific IC having code running thereon. Myriad different configurations for practicing the invention will be recognized by those of ordinary skill in the network arts provided the present disclosure.

CPE—

FIG. 4 illustrates an exemplary embodiment of the improved CPE 106 according to the present invention. As shown in the simplified diagram of FIG. 4, the device 106 generally comprises and OpenCable-compliant embedded system having an RF front end 402 (including tuner and demodulator/decryptors) for interface with the HFC network 101 of FIGS. 1-1*c*, digital processor(s) 404, storage device 406, and a plurality of interfaces 408 (e.g., video/audio interfaces, IEEE-1394 "Firewire", USB, serial/parallel ports, etc.) for interface with other end-user apparatus such as televisions, personal electronics, computers, WiFi or other network hubs/routers, etc. Other components which may be utilized within the device (deleted from FIG. 4 for simplicity) various processing layers (e.g., DOCSIS MAC or DAVIC OOB channel, MPEG, etc.) as well as media processors and other specialized SoC or ASIC devices. The CPE 106 may also comprise an integrated HD decoder, thereby relieving any connected monitors or other devices from the requirement of having such a decoder. These additional components and functionality are well known to those of ordinary skill in the cable and embedded system fields, and accordingly not described further herein.

The CPE 106 of FIG. 4 is also provided with an OCAP 1.0-compliant application and Java-based middleware which, inter alia, manages the operation of the device and applications running thereon (including the client process application 254). It will be recognized by those of ordinary skill that myriad different device and software architectures may be used consistent with the tuning functions of the present invention, the device of FIG. 4 being merely exemplary. For example, different middlewares (e.g., MHP, ARIB, or ACAP) may be used in place of the OCAP middleware of the illustrated embodiment.

The exemplary CPE 106 further comprises a conventional "Watch TV" application or the like, which services those program or user channels available over the network. The Watch TV application, residing in memory, provides such functions as channel navigation control, channel selection in response to a channel change event, etc. In one embodiment, the Watch TV application further comprises all necessary functionality need to support the client process 254.

Operations/Business Rules Engine

In another aspect of the invention, the aforementioned server process 252 (e.g., rendered as one or more computer programs) optionally includes a business rules engine. This engine comprises, in an exemplary embodiment, a series of software routines running on the server device 301 or other associated hardware/firmware environment adapted to control the operation of the anticipatory optimization algorithms previously described. These rules may also be fully integrated within the server process 252 itself, and controlled via e.g., a GUI on a PC connected to the server 301. In effect, the business rules engine comprises a supervisory entity which monitors and selectively controls, via the server process 252, the CPE data analysis and anticipatory control functions at a higher level, so as to implement desired operational or business rules. The rules engine can be considered an overlay of sorts to the algorithms of the server process 252 previously described. For example, the server process 252 may invoke certain operational protocols or decision processes based on data received from the CPE 106, as well as network operational data, demographic data, geographic data, etc. However, these processes may not always be compatible with higher-level business or operational goals, such as maximizing profit or system reliability. Hence, when imposed, the business/operational rules can be used to dynamically (or manually) control the operation of the server process 252, in conjunction with the operational "recommendations" generated by the server process 252 as part of its anticipatory control functions previously described.

For example, one rule implemented by the rules engine may comprise selectively switching certain broadcast channels to certain users first (e.g., those with a higher subscription priority or level) under bandwidth-limited cases, and only after this tier of users is satisfied, switching the channel to the remaining users.

Another rule might allow for the selective choice between two or more program streams that are eligible for reclamation. For example, the streams may have different advertising loading, and hence it may be desirable (from an advertising revenue perspective) to maintain the more highly advertising-laden stream and drop the others, all else being equal.

Similarly, channels can be allocated to those users which, e.g., based on demographics, historical patterns, geographic area, etc. will make best use of the bandwidth in terms of monetary return, profit, or some other business performance metric. For example, it may be know through historical usage or purchase data that certain zip codes will tend to respond better to increased targeted advertising than other zip codes (say, due to the increased disposable income of residents in that zip code). Hence, an advertiser's budget is most effectively used when their advertisements are included in streams which are switched into such zip codes. An MSO might also be able to charge a premium rate for advertising for such channels, since the advertiser's expected yield is typically higher than for channels switched into other zip codes. Accordingly, the MSO might invoke a business rule that selectively switches channels carrying only "premium" advertisements into the best zip codes (or demographic slices), while switching channels with second-tier advertisements into other zip codes or demographic slices. Such switching to certain zip codes can be performed using, inter alia, the methods and apparatus set forth in U.S. patent application Ser. No. 11/186,452 entitled "METHOD AND APPARATUS FOR BOUNDARY-BASED NETWORK OPERATION", previously referenced and incorporated herein.

Many other approaches and combinations are envisaged consistent with the invention, as will be recognized by those of ordinary skill when provided this disclosure. An example is the application of business rules in cases of arbitration of edge QAM resource allocation between contending services such as BSA and VoD. Another example is the prioritization or assignment of a "grade of service" to a specific program supplier (e.g. The Golf Channel) for a fee. A non-blocking grade of service can thus be assigned to the programmer wherein any CPE request for that programmer is honored at the expense of removal of a lower priority programmer based on business rules. Enforcement of such business rules may be executed by servers separately for each service (e.g. BSA or VoD) or centrally via the controlling actions of a master SRM (Session and Resource Manager) or other agent.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. Network server apparatus adapted for use in a broadcast switched digital network, said network having a plurality of client devices in communication therewith and being adapted to carry a plurality of program streams that are selectively switched in or out of delivery to said client devices by a switch disposed at a node of said network, said apparatus comprising:

a processor;

a storage device in data communication with said processor;

a network interface adapted to at least receive messages from said client devices; and a computer program operative to run on said server apparatus, said computer program being adapted to automatically:

receive, over time, data from said client devices via said messages and relating to an operation of individual ones of said client devices;

store said data on said storage device so as to form a historical database relating to an operation of a plurality of said client devices;

analyze at least portions of said database to identify patterns of interest therein;

generate one or more control values relating to an operation of said switched digital network based at least in part on said analysis;

implement said one or more control values to allocate bandwidth between individual ones of said plurality of program streams to be provided to a portion of said plurality of devices serviced by said node; and evaluate whether said identified patterns of interest manifests in predicted behavior of said plurality of client devices, the evaluation useful to improve analysis of said historical database.

2. The apparatus of claim 1, wherein said analysis to identify patterns comprises statistical analysis of usage patterns of said plurality of client devices.

3. The apparatus of claim 1, wherein said analysis to identify patterns comprises analysis of a first moving window of data having a first duration, and analysis of a second moving window of data having a second duration, said first duration being shorter than said second duration.

4. The apparatus of claim 1, wherein said one or more control values comprise at least one of: (i) total program stream pool size by service area; (ii) individual program stream reclamation times; and (iii) individual program stream initiation time.

5. The apparatus of claim 1, wherein said computer program is further adapted to determine a plurality of parameters relating to collection of said data by said client devices, and send information relating to these parameters to said client devices.

6. The apparatus of claim 5, wherein said plurality of parameters comprise at least one of (i) frequency of data sampling, and (ii) an interval or conditions upon which said data is sent to server apparatus.

7. The apparatus of claim 1, wherein said data comprises at least one of: (i) tuning activity on each client device and an associated timestamp; and (ii) remote control activity associated with each client device.

8. A method of allocating resources within a content distribution network comprising a plurality of consumer premises equipment (CPE) and first and second substantially independent content delivery subsystems, the method comprising:

obtaining historical data from individual ones of said plurality of CPE;

storing said historical data in a database; and analyzing said historical data to determine one or more patterns of behavior, said patterns of behavior being applied to each of said plurality of CPE via generation of operational control signals for said network, said control signals controlling allocation of said resources between said first and second delivery sub-systems and said plurality of CPE;

wherein:

when said one or more patterns of behavior predict similar viewership among a first portion of said plurality of CPE, said control signals causing said first portion of said plurality of CPE to receive content delivery from said first delivery sub-system; and when said one or more patterns of behavior predict similar viewership among a second portion of said plurality of CPE, said control signals causing said second portion of said plurality of CPE to receive content delivery from said second delivery sub-system.

9. The method of claim 8, wherein said first and second subsystems comprise broadcast-switched and video-on-demand (VOD) systems, respectively.

10. The method of claim 8, wherein said act of controlling allocation of said resources comprises controlling an allocation of bandwidth within at least one edge quadrature amplitude modulator (QAM) of said network.

11. The method of claim 8, wherein said act of controlling allocation of said resources comprises controlling an allocation of bandwidth based at least in part on said historical data obtained from a plurality of said CPE.

12. The method of claim 8, wherein said historical data comprises at least one of:

data regarding tuning activity of said CPE and an associated timestamp; and data regarding an operational status of said CPE.

13. The method of claim 8, wherein said act of controlling allocation of said resources comprises controlling an instantiation or termination of one or more program streams delivered via at least one of said first or second content delivery sub-systems.

14. A method for carrying a plurality of program streams that are selectively switched in or out of delivery to a plurality of client devices via a switch disposed at a node of a broadcast switched digital network, said method comprising:

receiving data from said client devices, said data relating to an operation of individual ones of said client devices;

creating a historical database relating to said operation of said individual ones of said plurality of said client devices;

allocating bandwidth between individual ones of a plurality of program streams to be provided to at least a portion of said plurality of client devices serviced by said node based at least in part on one or more control values relating to said operation of said individual ones of said client devices derived from information in said historical database;

identifying at least one pattern of interest in said historical database;

evaluating whether said identified patterns of interest manifests in predicted behavior of said plurality of client devices, said evaluation useful to improve analysis of said historical database.

15. The method of claim 14, wherein said act of receiving said data from said client devices occurs over an extended period of time.

16. The method of claim 14, wherein said act of allocating bandwidth further comprises said switch speculatively switching either to deliver or to not deliver individual ones of program streams to said client devices serviced thereby.

17. The method of claim 14, wherein said one or more control values are used to switch said node.

18. The method of claim 14, wherein said data relating to an operation of individual ones of said client devices comprises channel tuning data and duration data.

19. The method of claim 14, wherein said act of receiving data from said client devices is performed according to a periodic scheme and/or according to rules provided by a server application running on said node.

20. A network server apparatus configured to allocate resources within a content distribution network, said network comprising a plurality of consumer premises equipment (CPE) and at least two substantially independent content delivery subsystems, said apparatus comprising:

a first interface configured to obtain historical data from individual ones of said plurality of CPE;

a storage apparatus configured to store said historical data; and a processor configured to run a computer application thereon, said computer application comprising a plurality of instructions which are configured to, when executed:
    analyze said historical data to determine one or more patterns of behavior therein;
    generate a plurality of operational control signals for said network based at least in part on said one or more patterns of behavior; and
    utilizing said control signals to control allocation of said resources between said at least two substantially independent content delivery subsystems, such that:
        when said one or more patterns of behavior predict similar viewership among a first portion of said plurality of CPE, cause said first portion of said plurality of CPE to receive content delivery from a first delivery sub-system; and
        when said one or more patterns of behavior predict similar viewership among a second portion of said plurality of CPE, cause said second portion of said plurality of CPE to receive content delivery from a second delivery sub-system.

21. The apparatus of claim 20, wherein said content distribution network comprises a digital network and said CPE comprise digital set-top boxes (DSTBs).

22. The apparatus of claim 20, wherein said historical data comprises data relating to activity of one or more remote control units associated with said individual ones of said plurality of CPE.

23. The apparatus of claim 20, wherein said analysis comprises identification of one or more parameters comprises identifying at least one correlation between a historical event and a change in said data from a plurality of said client devices.

24. The apparatus of claim 20, wherein said analysis comprises a statistical analysis of said data from said individual ones of said plurality of CPE.

25. The apparatus of claim 20, wherein said plurality of CPE comprise devices within a service group served by a hub of a broadcast switched network.

\* \* \* \* \*